US010123220B2

(12) United States Patent
Li et al.

(10) Patent No.: US 10,123,220 B2
(45) Date of Patent: Nov. 6, 2018

(54) METHOD AND DEVICE FOR WIRELESSLY ACCESSING SERVICE

(71) Applicant: Huawei Technologies Co., Ltd., Shenzhen (CN)

(72) Inventors: Yingtao Li, Shenzhen (CN); Mingjie Dong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 161 days.

(21) Appl. No.: 15/241,865

(22) Filed: Aug. 19, 2016

(65) Prior Publication Data

US 2016/0360429 A1  Dec. 8, 2016

Related U.S. Application Data

(63) Continuation of application No. PCT/CN2014/083132, filed on Jul. 28, 2014.

(30) Foreign Application Priority Data

Feb. 19, 2014 (CN) .......................... 2014 1 0056660

(51) Int. Cl.
*H04W 72/04* (2009.01)
*H04W 24/02* (2009.01)
(Continued)

(52) U.S. Cl.
CPC ........... *H04W 24/02* (2013.01); *H04W 76/10* (2018.02); *H04W 84/005* (2013.01); *H04W 88/08* (2013.01); *H04B 7/0617* (2013.01)

(58) Field of Classification Search
CPC ...... H04W 72/04; H04W 88/08; H04W 76/00
See application file for complete search history.

(56) References Cited

U.S. PATENT DOCUMENTS 6,628,627 B1 * 9/2003 Zendle et al. ..... H04Q 11/0478
370/310
7,228,355 B2 * 6/2007 Dowling ................ G06Q 20/04
370/331
(Continued)

FOREIGN PATENT DOCUMENTS

CN           1501233 A      6/2004
CN         100571057 C     12/2009
(Continued)

OTHER PUBLICATIONS

Machine Translation and Abstract of Chinese Publication No. CN1501233, Jun. 2, 2004, 9 pages.
(Continued)

*Primary Examiner* — Hassan A Phillips
*Assistant Examiner* — Prenell P Jones
(74) *Attorney, Agent, or Firm* — Conley Rose, P.C.

(57) ABSTRACT

A method and device for wirelessly accessing a service, where the device detects whether a quality of a first wireless access link satisfies a communication quality requirement of a single mobile terminal, starts moving from a current location when the device determines that the quality of the first wireless access link does not satisfy the communication quality requirement of the single mobile terminal, and in a moving process, the device may detect whether a second wireless access link satisfies the communication quality requirement of the single mobile terminal, stop moving when the second wireless access link satisfies the communication quality requirement, and continue moving when the second wireless access link does not satisfy the communication quality requirement.

51 Claims, 8 Drawing Sheets

(51) Int. Cl.
*H04W 76/10* (2018.01)
*H04W 88/08* (2009.01)
*H04W 84/00* (2009.01)
*H04B 7/06* (2006.01)

(56) References Cited

U.S. PATENT DOCUMENTS

| | | | |
|---|---|---|---|
| 7,248,841 B2* | 7/2007 | Agee | H04B 7/0417 |
| | | | 455/101 |
| 2003/0091010 A1 | 5/2003 | Garahi et al. | |
| 2005/0070302 A1 | 3/2005 | Raghavachari | |
| 2006/0002326 A1 | 1/2006 | Vesuna | |
| 2009/0180451 A1* | 7/2009 | Alpert | H04W 72/1215 |
| | | | 370/338 |

FOREIGN PATENT DOCUMENTS

| | | |
|---|---|---|
| CN | 101677285 A | 3/2010 |
| CN | 102645932 A | 8/2012 |
| CN | 103268111 A | 8/2013 |
| CN | 103416085 A | 11/2013 |
| EP | 1675321 A1 | 6/2006 |
| GB | 2322262 A | 8/1998 |
| JP | 2004032062 A | 1/2004 |
| JP | 2011250159 A | 12/2011 |
| JP | 2012119771 A | 6/2012 |
| JP | 2015095666 A | 5/2015 |
| KR | 20040030102 | 4/2004 |
| WO | 2013010508 A1 | 1/2013 |

OTHER PUBLICATIONS

Machine Translation and Abstract of Chinese Publication No. CN102645932, Aug. 22, 2012, 5 pages.
Machine Translation and Abstract of Chinese Publication No. CN103268111, Aug. 28, 2013, 6 pages.
Machine Translation and Abstract of Chinese Publication No. CN103416085, Nov. 27, 2013, 3 pages.
Lu, Y., et al., "Hierarchical Structure for Supporting Movable Base Stations in Wireless Networks," XP10637893, 10th International Conference on Telecommunications, Apr. 2, 2003, pp. 729-736.
Foreign Communication From A Counterpart Application, European Application No. 14883274.4, Extended European Search Report dated Mar. 10, 2017, 6 pages.
Foreign Communication From A Counterpart Application, PCT Application No. PCT/CN2014/083132, English Translation of International Search Report dated Nov. 26, 2014, 2 pages.
Foreign Communication From A Counterpart Application, PCT Application No. PCT/CN2014/083132, English Translation of Written Opinion dated Nov. 26, 2014, 9 pages.
Machine Translation and Abstract of Japanese Publication No. JP2004032062, Jan. 29, 2004, 32 pages.
Machine Translation and Abstract of Japanese Publication No. JP2011250159, Dec. 8, 2011, 11 pages.
Machine Translation and Abstract of Japanese Publication No. JP2012119771, Jun. 21, 2012, 31 page.
Machine Translation and Abstract of Japanese Publication No. JP2015095666, May 18, 2015, 36 pages.
Foreign Communication From A Counterpart Application, Japanese Application No. 2016-552960, Japanese Office Action dated Nov. 21, 2017, 6 pages.
Foreign Communication From A Counterpart Application, Japanese Application No. 2016-552960, English Translation of Japanese Office Action dated Nov. 21, 2017, 8 pages.
Foreign Communication From A Counterpart Application, Korean Application No. 10-2016-7025273, Korean Notice of Allowance and Brief Translation of Apr. 30, 2018, 3 pages.

* cited by examiner

METHOD AND DEVICE FOR WIRELESSLY ACCESSING SERVICE

CROSS-REFERENCE TO RELATED APPLICATIONS

This application is a continuation of international patent application number PCT/CN2014/083132 filed on Jul. 28, 2014, which claims priority to Chinese patent application number 201410056660.1 filed on Feb. 19, 2014, both of which are incorporated by reference.

TECHNICAL FIELD

Embodiments of the present disclosure relate to communications technologies, and in particular, to a method and a device for wirelessly accessing a service.

BACKGROUND

In an existing wireless communications system, a mobile terminal accesses a network using a wireless access device. The mobile terminal is movable. Quality of a wireless access link between the mobile terminal and the wireless access device may vary when the mobile terminal moves to different locations. For example, the quality of the wireless access link deteriorates when the mobile terminal is located relatively far away from the wireless access device. An existing wireless access device is generally disposed at a specific location fixedly, and therefore, a communication quality requirement of the mobile terminal cannot be satisfied when the mobile terminal is far away from the wireless access device for reasons such as movement.

SUMMARY

Embodiments of the present disclosure provide a method and device for wirelessly accessing a service, to satisfy a communication quality requirement of a mobile terminal.

A first aspect of the embodiments of the present disclosure provides a method for wirelessly accessing a service, including detecting, by a wireless access device, whether quality of a first wireless access link satisfies a communication quality requirement of a single mobile terminal, where the first wireless access link is a wireless access link between the wireless access device at a current location and the mobile terminal, starting, by the wireless access device, moving when the wireless access device determines that the quality of the first wireless access link does not satisfy the communication quality requirement of the single mobile terminal, detecting, by the wireless access device in a moving process of the wireless access device, whether quality of a second wireless access link satisfies the communication quality requirement of the single mobile terminal, where the second wireless access link is a wireless access link between the wireless access device at a location after the movement and the mobile terminal, stopping, by the wireless access device, moving when the quality of the second wireless access link satisfies the communication quality requirement of the single mobile terminal, or continuing, by the wireless access device, moving when the quality of the second wireless access link does not satisfy the communication quality requirement of the single mobile terminal.

With reference to the first aspect, in a first possible implementation manner, the communication quality requirement of the single mobile terminal is that a received signal strength indicator (RSSI) of the mobile terminal is not less than an RSSI threshold or that an access rate of the mobile terminal is not less than an access rate threshold or that an access bandwidth of the mobile terminal is not less than an access bandwidth threshold.

With reference to the first possible implementation manner of the first aspect, in a second possible implementation manner, that the communication quality requirement of the single mobile terminal is that an RSSI of the mobile terminal is not less than an RSSI threshold includes an RSSI of the mobile terminal in a current service type is not less than an RSSI threshold required by the current service type. An access rate of the mobile terminal that is not less than an access rate threshold includes an access rate of the mobile terminal in the current service type is not less than an access rate threshold required by the current service type, and an access bandwidth of the mobile terminal that is not less than an access bandwidth threshold includes an access bandwidth of the mobile terminal in the current service type is not less than an access bandwidth threshold required by the current service type.

With reference to the first aspect, in a third possible implementation manner, detecting, by the wireless access device in a moving process of the wireless access device, whether quality of a second wireless access link satisfies the communication quality requirement of the single mobile terminal includes setting, by the wireless access device, a periodical detection timer in the moving process of the wireless access device, and enabling a detection of whether the quality of the second wireless access link satisfies the communication quality requirement of the single mobile terminal when the timer expires.

With reference to the first aspect or any one of the first to the third possible implementation manners, in a fourth possible implementation manner, starting, by the wireless access device, moving when the wireless access device determines that the quality of the first wireless access link does not satisfy the communication quality requirement of the single mobile terminal includes determining, by the wireless access device, a first target direction according to a parameter of the first wireless access link when the wireless access device determines that the quality of the first wireless access link does not satisfy the communication quality requirement of the single mobile terminal, and starting, by the wireless access device, moving in the first target direction.

With reference to the fourth possible implementation manner, in a fifth possible implementation manner, determining, by the wireless access device, a first target direction according to a parameter of the first wireless access link includes acquiring, by the wireless access device according to the parameter of the first wireless access link, a direction of the mobile terminal relative to the wireless access device, and determining, by the wireless access device, that the direction of the mobile terminal relative to the wireless access device is the first target direction.

With reference to the fourth possible implementation manner, in a sixth possible implementation manner, determining, by the wireless access device, a first target direction according to a parameter of the first wireless access link includes determining, by the wireless access device, the first target direction according to a direction of an antenna beam used by the mobile terminal for accessing the wireless access device.

With reference to the fourth possible implementation manner, in a seventh possible implementation manner, determining, by the wireless access device, a first target direction according to a parameter of the first wireless access link includes determining, by the wireless access device according to angles of arrival of antenna beams transmitted from the mobile terminal to two antennas in an antenna array of the wireless access device, a direction of the mobile terminal relative to the wireless access device, and determining, by the wireless access device, that the direction of the mobile terminal relative to the wireless access device is the first target direction.

With reference to the first aspect, in an eighth possible implementation manner, continuing, by the wireless access device, moving when the quality of the second wireless access link does not satisfy the communication quality requirement of the single mobile terminal includes determining, by the wireless access device, a second target direction according to a parameter of the second wireless access link, and moving, by the wireless access device, in the second target direction.

With reference to the eighth possible implementation manner, in a ninth possible implementation manner, determining, by the wireless access device, a second target direction according to a parameter of the second wireless access link includes acquiring, by the wireless access device according to the parameter of the second wireless access link, a direction of the mobile terminal relative to the wireless access device, and determining, by the wireless access device, that the direction of the mobile terminal relative to the wireless access device is the second target direction.

With reference to the eighth possible implementation manner, in a tenth possible implementation manner, determining, by the wireless access device, a second target direction according to a parameter of the second wireless access link includes determining, by the wireless access device, the second target direction according to a direction of an antenna beam used by the mobile terminal for accessing the wireless access device.

With reference to the eighth possible implementation manner, in an eleventh possible implementation manner, determining, by the wireless access device, a second target direction according to a parameter of the second wireless access link includes determining, by the wireless access device according to angles of arrival of antenna beams transmitted from the mobile terminal to two antennas in an antenna array of the wireless access device, a direction of the mobile terminal relative to the wireless access device, and determining, by the wireless access device, that the direction of the mobile terminal relative to the wireless access device is the second target direction.

With reference to the eighth possible implementation manner, in a twelfth possible implementation manner, before determining, by the wireless access device, a second target direction according to a parameter of the second wireless access link, the method further includes determining, by the wireless access device, whether a quantity of times a result of a detection is inferior to a result of a previous detection among results of recent N detections of the quality of the second wireless access link is greater than or equal to a threshold, and determining, by the wireless access device, the second target direction according to the parameter of the second wireless access link if the quantity of times is greater than or equal to the threshold, or continuing, by the wireless access device, moving in the second target direction if the quantity of times is less than the threshold.

With reference to any one of the fourth to the seventh possible implementation manners, in a thirteenth possible implementation manner, after determining, by the wireless access device, a first target direction according to a parameter of the first wireless access link, and before starting, by the wireless access device, moving in the first target direction, the method further includes sensing, by the wireless access device using a sensor, obstacle information in an environment in which the wireless access device and the mobile terminal are located, and constructing, according to the obstacle information sensed by the sensor, the environment in which the wireless access device and the mobile terminal are located, and adjusting, by the wireless access device, the first target direction according to the environment in which the wireless access device and the mobile terminal are located.

With reference to any one of the eighth to the twelfth possible implementation manners, in a fourteenth possible implementation manner, after determining, by the wireless access device, a second target direction according to a parameter of the second wireless access link, and before moving, by the wireless access device, in the second target direction, the method further includes sensing, by the wireless access device using a sensor, obstacle information in an environment in which the wireless access device and the mobile terminal are located, and constructing, according to the obstacle information sensed by the sensor, the environment in which the wireless access device and the mobile terminal are located, and adjusting, by the wireless access device, the second target direction according to the environment in which the wireless access device and the mobile terminal are located.

A second aspect of the embodiments of the present disclosure provides a method for wirelessly accessing a service, including detecting, by a wireless access device, whether quality of a first group of wireless access links satisfies a communication quality requirement of a mobile terminal set, where the first group of wireless access links includes R first wireless access links, the first wireless access link is a wireless access link between the wireless access device at a current location and any mobile terminal of R mobile terminals, and the R mobile terminals are R mobile terminals of M mobile terminals that access the wireless access device, where M≥1, and 1≤R≤M, and moving, by the wireless access device, from the current location to a target location when the wireless access device determines that the quality of the first group of wireless access links does not satisfy the communication quality requirement of the mobile terminal set, where when the wireless access device moves to the target location, quality of a second group of wireless access links satisfies the communication quality requirement of the mobile terminal set, where the second group of wireless access links includes R second wireless access links, and the second wireless access link is a wireless access link between the wireless access device at the target location and any mobile terminal of the R mobile terminals.

With reference to the second aspect, in a first possible implementation manner, the communication quality requirement of the mobile terminal set is that each terminal of terminals of a preset quantity in the R mobile terminals or all terminals in the R mobile terminals satisfies a communication quality requirement of a single mobile terminal, where the communication quality requirement of the single mobile terminal is that an RSSI of the mobile terminal is not less than an RSSI threshold or that an access rate of the mobile terminal is not less than an access rate threshold or that an access bandwidth of the mobile terminal is not less than an access bandwidth threshold.

With reference to the second aspect or the first possible implementation manner, in a second possible implementation manner, before moving, by the wireless access device, from the current location to a target location, the method further includes determining, by the wireless access device, the target location according to parameters of the R first wireless access links.

With reference to the second possible implementation manner, in a third possible implementation manner, determining, by the wireless access device, the target location according to parameters of the R first wireless access links includes acquiring, by the wireless access device according to the parameters of the R first wireless access links, location information of each of the R mobile terminals relative to the wireless access device, and determining, by the wireless access device, the target location according to the location information of the R mobile terminals relative to the wireless access device.

With reference to the third possible implementation manner, in a fourth possible implementation manner, acquiring, by the wireless access device according to the parameters of the R first wireless access links, location information of each of the R mobile terminals relative to the wireless access device includes determining, by the wireless access device according to a direction of an antenna beam used by each of the R mobile terminals for accessing the wireless access device, a direction of each of the R mobile terminals relative to the wireless access device, determining, by the wireless access device according to a time of arrival (TOA), a distance of each of the R mobile terminals relative to the wireless access device, and determining, by the wireless access device according to the direction and the distance, the location information of each of the R mobile terminals relative to the wireless access device.

With reference to the third possible implementation manner, in a fifth possible implementation manner, acquiring, by the wireless access device according to the parameters of the R first wireless access links, location information of each of the R mobile terminals relative to the wireless access device includes determining, by the wireless access device according to angles of arrival of each of the R mobile terminals at two antennas in an antenna array, a direction and a distance of each of the R mobile terminals relative to the wireless access device.

With reference to the second aspect or any one of the first to the fifth possible implementation manners, in a sixth possible implementation manner, moving, by the wireless access device, from the current location to a target location when the wireless access device determines that the quality of the first group of wireless access links does not satisfy the communication quality requirement of the mobile terminal set includes determining, by the wireless access device, whether the quality of the first group of wireless access links satisfies the communication quality requirement of the mobile terminal set in recent previous N detections, where N is an integer greater than or equal to 1, and triggering, by the wireless access device, the wireless access device to move from the current location to the target location when the quality of the first group of wireless access links does not satisfy the communication quality requirement of the mobile terminal set in the recent previous N detections.

With reference to any one of the second to the sixth possible implementation manners, in a seventh possible implementation manner, after determining, by the wireless access device, the target location according to parameters of the R first wireless access links, the method further includes adjusting, by the wireless access device, the target location according to an environment in which the wireless access device and the R mobile terminals are located, to obtain an adjusted target location, and moving, by the wireless access device, from the current location to a target location includes moving, by the wireless access device, from the current location to the adjusted target location.

With reference to the seventh possible implementation manner, in an eighth possible implementation manner, before adjusting, by the wireless access device, the target location according to an environment in which the wireless access device and the R mobile terminals are located, to obtain an adjusted target location, the method further includes sensing, by the wireless access device using a sensor, obstacle information in the environment in which the wireless access device and the R mobile terminals are located, and constructing, according to the obstacle information sensed by the sensor, the environment in which the wireless access device and the R mobile terminals are located.

With reference to the second aspect or any one of the first to the sixth possible implementation manners, in a ninth possible implementation manner, after moving, by the wireless access device, from the current location to a target location, the method further includes receiving, by the wireless access device, a result of comparing the quality of the second group of wireless access links with the quality of the first group of wireless access links, where the result is fed back by the wireless access device, and determining, by the wireless access device, a target location of a next movement according to the result of comparing and parameters of the second wireless access links.

With reference to any one of the second to the sixth possible implementation manners, in a tenth possible implementation manner, after determining, by the wireless access device, the target location according to parameters of the R first wireless access links, the method further includes performing, by the wireless access device, a local simulation to verify whether the second group of wireless access links satisfies the communication quality requirement of the mobile terminal set after the wireless access device moves to the target location, and moving, by the wireless access device, from the current location to a target location when the wireless access device determines that the quality of the first group of wireless access links does not satisfy the communication quality requirement of the mobile terminal set includes moving, by the wireless access device, from the current location to the target location when the wireless access device determines that a result of the local simulation is that the second group of wireless access links satisfies the communication quality requirement of the mobile terminal set.

A third aspect of the embodiments of the present disclosure provides a method for wirelessly accessing a service, including detecting, by a remote control center, whether quality of a first group of wireless access links satisfies a communication quality requirement of a mobile terminal set, where the first group of wireless access links includes R first wireless access links, the first wireless access link is a wireless access link between a wireless access device at a current location and any mobile terminal of R mobile terminals, and the R mobile terminals are R mobile terminals of M mobile terminals that access the wireless access device, where $M \geq 1$, and $1 \leq R \leq M$, and triggering, by the remote control center, the wireless access device to move from the current location to a target location when the remote control center determines that the quality of the first group of wireless access links does not satisfy the communication quality requirement of the mobile terminal set, where quality of a second group of wireless access links satisfies the communication quality requirement of the mobile terminal set when the wireless access device moves to the target location, where the second group of wireless access links includes R second wireless access links, and the second wireless access link is a wireless access link between the wireless access device at the target location and any mobile terminal of the R mobile terminals.

A fourth aspect of the embodiments of the present disclosure provides a device for wirelessly accessing a service, where the device for wirelessly accessing a service is a wireless access device, including a first detection module configured to detect whether quality of a first wireless access link satisfies a communication quality requirement of a single mobile terminal, where the first wireless access link is a wireless access link between the wireless access device at a current location and the mobile terminal, a first control module configured to control the wireless access device to start moving when the wireless access device determines that the quality of the first wireless access link does not satisfy the communication quality requirement of the single mobile terminal, a second detection module configured to detect, in a moving process of the wireless access device, whether quality of a second wireless access link satisfies the communication quality requirement of the single mobile terminal, where the second wireless access link is a wireless access link between the wireless access device at a location after the movement and the mobile terminal, and a second control module configured to control the wireless access device to stop moving when the quality of the second wireless access link satisfies the communication quality requirement of the single mobile terminal, or control the wireless access device to continue moving when the quality of the second wireless access link does not satisfy the communication quality requirement of the single mobile terminal.

With reference to the fourth aspect, in a first possible implementation manner, the second detection module is further configured to set a periodical detection timer in the moving process of the wireless access device, and enable a detection of whether the quality of the second wireless access link satisfies the communication quality requirement of the single mobile terminal when the timer expires.

With reference to the fourth aspect or the first possible implementation manner, in a second possible implementation manner, the first control module is further configured to control the wireless access device to determine a first target direction according to a parameter of the first wireless access link when the first detection module determines that the quality of the first wireless access link does not satisfy the communication quality requirement of the single mobile terminal, and control the wireless access device to start moving in the first target direction.

With reference to the second possible implementation manner, in a third possible implementation manner, the first control module is further configured to control the wireless access device to acquire, according to the parameter of the first wireless access link, a direction of the mobile terminal relative to the wireless access device, and control the wireless access device to determine that the direction of the mobile terminal relative to the wireless access device is the first target direction.

With reference to the second possible implementation manner, in a fourth possible implementation manner, the first control module is further configured to control the wireless access device to determine the first target direction according to a direction of an antenna beam used by the mobile terminal for accessing the wireless access device.

With reference to the second possible implementation manner, in a fifth possible implementation manner, the first control module is further configured to control the wireless access device to determine, according to angles of arrival of antenna beams transmitted from the mobile terminal to two antennas in an antenna array of the wireless access device, a direction of the mobile terminal relative to the wireless access device, and control the wireless access device to determine that the direction of the mobile terminal relative to the wireless access device is the first target direction.

With reference to the fourth aspect, in a sixth possible implementation manner, the second control module is further configured to control the wireless access device to determine a second target direction according to a parameter of the second wireless access link, and control the wireless access device to move in the second target direction.

With reference to the sixth possible implementation manner, in a seventh possible implementation manner, the second control module is further configured to control the wireless access device to acquire, according to the parameter of the second wireless access link, a direction of the mobile terminal relative to the wireless access device, and control the wireless access device to determine that the direction of the mobile terminal relative to the wireless access device is the second target direction.

With reference to the sixth possible implementation manner, in an eighth possible implementation manner, the second control module is further configured to control the wireless access device to determine the second target direction according to a direction of an antenna beam used by the mobile terminal for accessing the wireless access device.

With reference to the sixth possible implementation manner, in a ninth possible implementation manner, the second control module is further configured to control the wireless access device to determine, according to angles of arrival of antenna beams transmitted from the mobile terminal to two antennas in an antenna array of the wireless access device, a direction of the mobile terminal relative to the wireless access device, and control the wireless access device to determine that the direction of the mobile terminal relative to the wireless access device is the second target direction.

With reference to the sixth possible implementation manner, in a tenth possible implementation manner, the second control module is further configured to control the second detection module to determine whether a quantity of times a result of a detection is inferior to a result of a previous detection among results of recent N detections of the quality of the second wireless access link is greater than or equal to a threshold, and control the wireless access device to determine the second target direction according to the parameter of the second wireless access link if the quantity of times is greater than or equal to the threshold, or control the wireless access device to continue moving in the second target direction if the quantity of times is less than the threshold.

With reference to any one of the second to the fifth possible implementation manners, in an eleventh possible implementation manner, the first control module is further configured to control the wireless access device to sense, using a sensor, obstacle information in an environment in which the wireless access device and the mobile terminal are located and to construct, according to the obstacle information sensed by the sensor, the environment in which the wireless access device and the mobile terminal are located, and control the wireless access device to adjust the first target direction according to the environment in which the wireless access device and the mobile terminal are located.

With reference to any one of the sixth to the tenth possible implementation manners, in a twelfth possible implementation manner, the second control module is further configured to control the wireless access device to sense, using a sensor, obstacle information in an environment in which the wireless access device and the mobile terminal are located and to construct, according to the obstacle information sensed by the sensor, the environment in which the wireless access device and the mobile terminal are located, and control the wireless access device to adjust the second target direction according to the environment in which the wireless access device and the mobile terminal are located.

A fifth aspect of the embodiments of the present disclosure provides a device for wirelessly accessing a service, where the device for wirelessly accessing a service is a wireless access device, including a detection module configured to detect whether quality of a first group of wireless access links satisfies a communication quality requirement of a mobile terminal set, where the first group of wireless access links includes R first wireless access links, the first wireless access link is a wireless access link between the wireless access device at a current location and any mobile terminal of R mobile terminals, and the R mobile terminals are R mobile terminals of M mobile terminals that access the wireless access device, where M≥1, and 1≤R≤M, and a control module configured to trigger the wireless access device to move from the current location to a target location when the detection module determines that the quality of the first group of wireless access links does not satisfy the communication quality requirement of the mobile terminal set, where quality of a second group of wireless access links satisfies the communication quality requirement of the mobile terminal set when the wireless access device moves to the target location, where the second group of wireless access links includes R second wireless access links, and the second wireless access link is a wireless access link between the wireless access device at the target location and any mobile terminal of the R mobile terminals.

With reference to the fifth aspect, in a first possible implementation manner, the device further includes a path planning module configured to determine the target location according to parameters of the R first wireless access links before the control module triggers the wireless access device to move from the current location to the target location.

With reference to the first possible implementation manner, in a second possible implementation manner, the path planning module is further configured to acquire, according to the parameters of the R first wireless access links, location information of each of the R mobile terminals relative to the wireless access device, and determine the target location according to the location information of the R mobile terminals relative to the wireless access device.

With reference to the second possible implementation manner, in a third possible implementation manner, the path planning module is further configured to determine, according to a direction of an antenna beam used by each of the R mobile terminals for accessing the wireless access device, a direction of each of the R mobile terminals relative to the wireless access device, determine, according to a time of arrival TOA, a distance of each of the R mobile terminals relative to the wireless access device, and determine, according to the direction and the distance, the location information of each of the R mobile terminals relative to the wireless access device.

With reference to the second possible implementation manner, in a fourth possible implementation manner, the path planning module is further configured to determine, according to angles of arrival of each of the R mobile terminals at two antennas in an antenna array, a direction and a distance of each of the R mobile terminals relative to the wireless access device.

With reference to the fifth aspect or the first to the fourth possible implementation manners, in a fifth possible implementation manner, the control module is further configured to determine whether the quality of the first group of wireless access links satisfies the communication quality requirement of the mobile terminal set in recent previous N detections, where N is an integer greater than or equal to 1, and control the wireless access device to move from the current location to the target location when the quality of the first group of wireless access links does not satisfy the communication quality requirement of the mobile terminal set in the recent previous N detections.

With reference to the first to fifth possible implementation manners, in a sixth possible implementation manner, the path planning module is further configured to adjust the target location according to an environment in which the wireless access device and the R mobile terminals are located to obtain an adjusted target location after determining the target location according to the parameters of the R first wireless access links, and the control module is further configured to trigger the wireless access device to move from the current location to the adjusted target location.

With reference to the sixth possible implementation manner, in a seventh possible implementation manner, the path planning module is further configured to sense, using a sensor, obstacle information in the environment in which the wireless access device and the R mobile terminals are located, and construct, according to the obstacle information sensed by the sensor, the environment in which the wireless access device and the R mobile terminals are located before adjusting the target location according to the environment in which the wireless access device and the R mobile terminals are located to obtain the adjusted target location.

With reference to the fifth aspect or the first to the fifth possible implementation manners, in an eighth possible implementation manner, the path planning module is further configured to receive a result of comparing the quality of the second group of wireless access links with the quality of the first group of wireless access links after the wireless access device is triggered to move from the current location to the target location, where the result is fed back by the wireless access device, and determine a target location of a next movement according to the result of comparing and parameters of the second wireless access links.

With reference to the first to the fifth possible implementation manners, in a ninth possible implementation manner, after the path planning module determines the target location according to the parameters of the R first wireless access links, the control module is further configured to perform a local simulation to verify whether the second group of wireless access links satisfies the communication quality requirement of the mobile terminal set after the wireless access device moves to the target location, and the control module is further configured to trigger the wireless access device to move from the current location to the target location when a result of the local simulation is that the second group of wireless access links satisfies the communication quality requirement of the mobile terminal set.

A sixth aspect of the embodiments of the present disclosure provides a device for wirelessly accessing a service, where the device for wirelessly accessing a service is a remote control center, including a detection module configured to detect whether quality of a first group of wireless access links satisfies a communication quality requirement of a mobile terminal set, where the first group of wireless access links includes R first wireless access links, the first wireless access link is a wireless access link between a wireless access device at a current location and any mobile terminal of R mobile terminals, and the R mobile terminals are R mobile terminals of M mobile terminals that access the wireless access device, where M≥1, and 1≤R≤M, and a control module configured to trigger, by the remote control center, the wireless access device to move from the current location to a target location when the quality of the first group of wireless access links does not satisfy the communication quality requirement of the mobile terminal set, where quality of a second group of wireless access links satisfies the communication quality requirement of the mobile terminal set when the wireless access device moves to the target location, where the second group of wireless access links includes R second wireless access links, and the second wireless access link is a wireless access link between the wireless access device at the target location and any mobile terminal of the R mobile terminals.

According to the method and the device for wirelessly accessing a service provided in the embodiments of the present disclosure, a wireless access device detects whether quality of a first wireless access link satisfies a communication quality requirement of a single mobile terminal. The wireless access device starts moving from a current location if the wireless access device determines that the quality of the first wireless access link does not satisfy the communication quality requirement of the single mobile terminal. In a moving process, the wireless access device may detect whether a second wireless access link satisfies the communication quality requirement of the single mobile terminal, and stop moving if the second wireless access link satisfies the communication quality requirement or continue moving if the second wireless access link does not satisfy the communication quality requirement. That is, quality of a wireless access link is improved by means of movement of the wireless access device, thereby satisfying the communication quality requirement of the single mobile terminal.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

The following clearly and describes the technical solutions in the embodiments of the present disclosure with reference to the accompanying drawings in the embodiments of the present disclosure. The described embodiments are merely some but not all of the embodiments of the present disclosure. All other embodiments obtained by persons of ordinary skill in the art based on the embodiments of the present disclosure without creative efforts shall fall within the protection scope of the present disclosure.

A wireless access device in the present disclosure provides a function of automatic movement. A main idea of the present disclosure is that when quality of a wireless access link between the wireless access device and a mobile terminal cannot satisfy a communication quality requirement of the mobile terminal, the quality of the wireless access link between the wireless access device and the mobile terminal is improved by means of movement of the wireless access device in order to satisfy the communication quality requirement of the mobile terminal.

The following describes technical solutions of the present disclosure in detail using specific embodiments. The following several specific embodiments may be combined, and same or similar concepts or processes may not be repeated in some embodiments.

Figure 1:
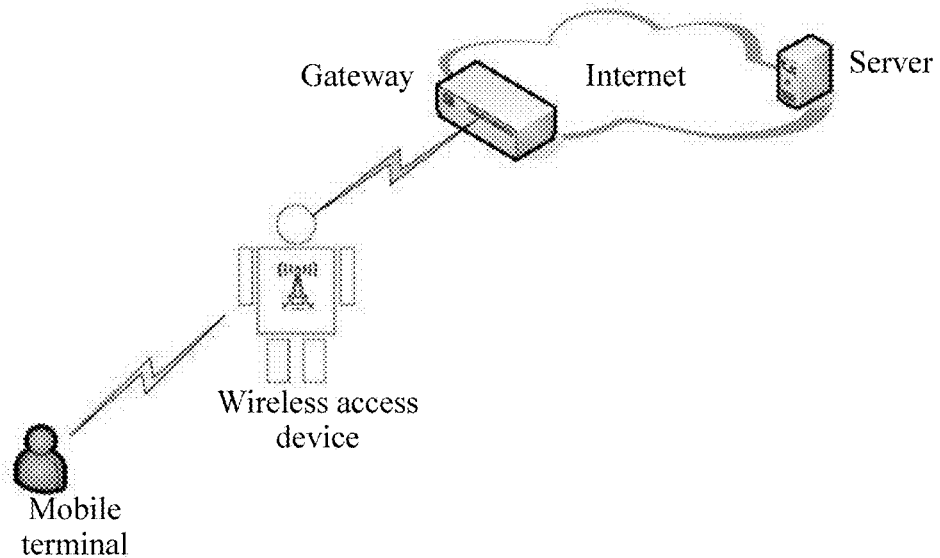
FIG. 1 is an architectural diagram of a system 1 according to the present disclosure.
Figure 2:
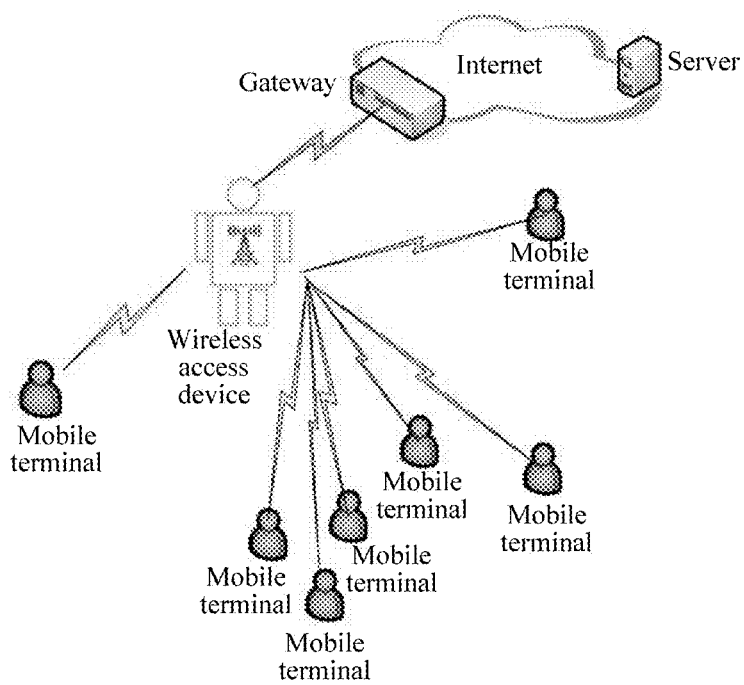
FIG. 2 is an architectural diagram of a system 2 according to the present disclosure.

Generally, one wireless access device may be accessed by M mobile terminals, where M≥1. The foregoing M mobile terminals access the Internet using the wireless access device. A scenario is shown in FIG. 1 when M is equal to 1, where FIG. 1 is an architectural diagram of a system 1 according to the present disclosure. A scenario is shown in FIG. 2 when M>1, where FIG. 2 is an architectural diagram of a system 2 according to the present disclosure, that is, multiple mobile terminals access the Internet using a same wireless access device.

Figure 3:
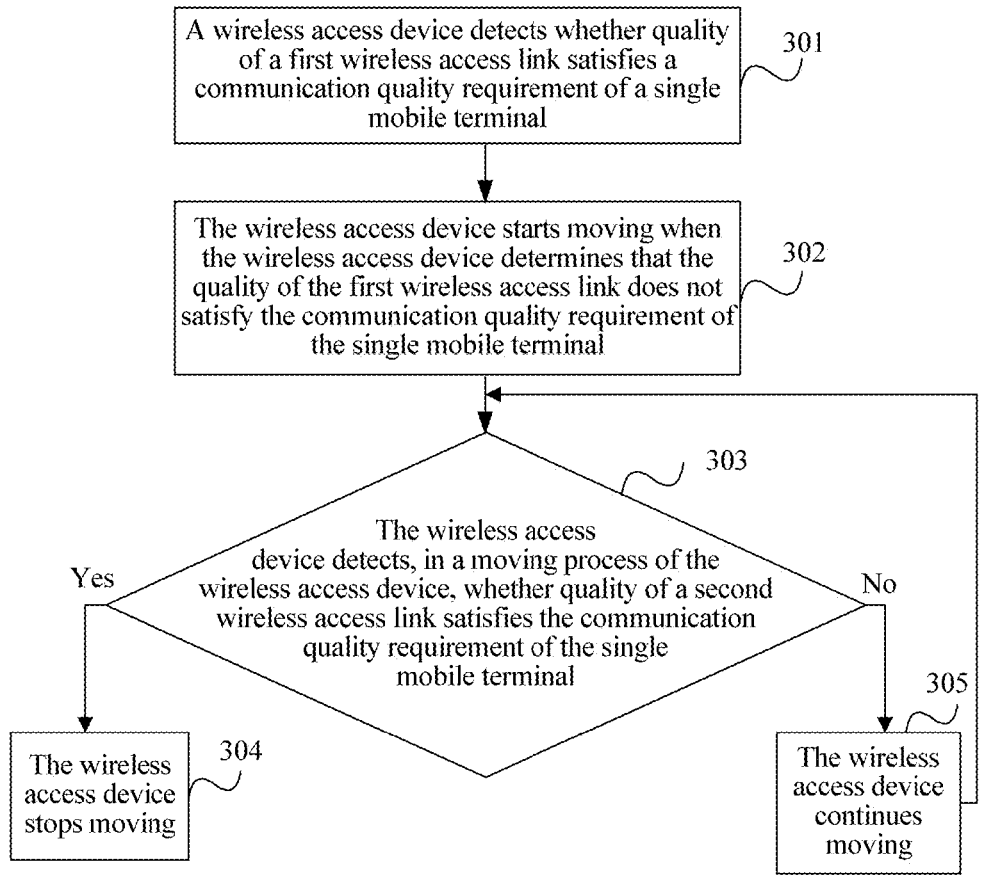
FIG. 3 is a schematic flowchart of Embodiment 1 of a method for wirelessly accessing a service according to the present disclosure.

FIG. 3 is a schematic flowchart of Embodiment 1 of a method for wirelessly accessing a service according to the present disclosure. As shown in FIG. 3, this embodiment is executed by a wireless access device. The wireless access device in this embodiment provides a function of automatic movement, which may be implemented by a robot. An application scenario of this embodiment is that there is a specific mobile terminal in a mobile terminal that accesses the wireless access device. For example, the specific mobile terminal may be a very important person (VIP) for an operator. Generally, the operator may give priority to satisfying a communication quality requirement of the specific mobile terminal. For ease of description, in the embodiment shown in FIG. 3, "a communication quality requirement of a single mobile terminal" refers to the communication quality requirement of the specific mobile terminal, and "mobile terminal" refers to the specific mobile terminal rather than all mobile terminals that access the wireless access device. The method in this embodiment is as follows.

Step 301. A wireless access device detects whether quality of a first wireless access link satisfies a communication quality requirement of a single mobile terminal.

The first wireless access link is a wireless access link between the wireless access device at a current location and the mobile terminal.

The wireless access device may periodically broadcast its existence, which ensures that there is a mobile terminal accessing the wireless access device in a wireless manner after discovering the wireless access device.

The quality of the first wireless access link may be learned in the following two manners but without being limited to the following two manners. In a first manner, the wireless access device learns the quality by means of a periodical detection. Further, the wireless access device sets a timer of a specific period, and acquires a parameter indicating the quality of the first wireless access link when the timer expires, where the parameter indicating the quality of the first wireless access link may be information about an RSSI between the mobile terminal and the wireless access device, information about an access rate or an access bandwidth of a mobile terminal user, a service type of the mobile terminal, or the like. In a second manner, the quality of the first wireless access link may also be learned in a manner in which the mobile terminal periodically reports a parameter.

The communication quality requirement of the single mobile terminal may include at least one of the following. RSSI strength is not less than an RSSI threshold, or an access rate is not less than an access rate threshold, or an access bandwidth is not less than an access bandwidth threshold, where the RSSI strength, the access rate, and the access bandwidth may be pertinent to a current service type, and an RSSI of the mobile terminal in the current service type is not less than an RSSI threshold required by the current service type, or an access rate of the mobile terminal in the current service type is not less than an access rate threshold required by the current service type, or an access bandwidth of the mobile terminal in the current service type is not less than an access bandwidth threshold required by the current service type.

The following provides descriptions using an example in which the communication quality requirement of the mobile terminal is that the RSSI strength is not less than the RSSI threshold. The wireless access device determines that the quality of the first wireless access link can no longer satisfy the communication quality requirement of the mobile terminal when detecting that an RSSI of the first wireless access link is less than the RSSI threshold. Setting of another communication quality threshold is similar and is not described herein again.

The foregoing periodical detection of or periodical reporting of the quality of the first wireless access link may be implemented locally by the wireless access device using a timer. For example, the wireless access device may locally set a timer with a time of 1 min, and then the wireless access device detects, at intervals of one minute, whether a current wireless access link satisfies the communication quality requirement of the mobile terminal. No matter whether the wireless access device is static or moving, the timer periodically triggers a quality detection of the wireless access link.

It should be noted that the periodical detection or periodical reporting is only one implementation manner. A detection may be performed in another manner according to an actual requirement in the present disclosure, and the present disclosure sets no limitation thereto.

Step 302: The wireless access device starts moving when the wireless access device determines that the quality of the first wireless access link does not satisfy the communication quality requirement of the single mobile terminal.

That is, when the wireless access device is static, the wireless access device is triggered to start moving if it is detected that the first wireless access link does not satisfy the communication quality requirement of the single mobile terminal, or the current state continues to be retained if it is detected that the wireless access link satisfies the communication quality requirement of the mobile terminal.

Step 303: The wireless access device detects, in a moving process of the wireless access device, whether quality of a second wireless access link satisfies the communication quality requirement of the single mobile terminal, and 304 is performed if the quality satisfies the communication quality requirement, or 305 is performed if the quality does not satisfy the communication quality requirement.

The second wireless access link is a wireless access link between the wireless access device at a location after the movement and the mobile terminal.

Step 304: The wireless access device stops moving.

Step 305: The wireless access device continues moving.

The wireless access device performs step S303 in a process of continuing moving.

That is, the wireless access device stops moving when the wireless access device detects, in the moving process, that the second wireless access link satisfies the communication quality requirement of the single mobile terminal, or the wireless access device continues moving when the wireless access device detects that the second wireless access link does not satisfy the communication quality requirement of the single mobile terminal. Detecting, by the wireless access device in a moving process, whether quality of a second wireless access link satisfies the communication quality requirement of the single mobile terminal may be that the wireless access device sets a periodical detection timer, and enables a detection of whether the quality of the second wireless access link satisfies the communication quality requirement of the single mobile terminal when the timer expires. This method is similar to a method for detecting whether the quality of the first wireless access link satisfies the communication quality requirement of the single mobile terminal, and details are not described herein again.

Step 303 is performed in the process in which the wireless access device continues moving, and the wireless access device stops moving when the communication quality of the second wireless access link between the wireless access device and the mobile terminal satisfies the communication quality requirement of the single mobile terminal.

After determining that the communication quality requirement of the single mobile terminal needs to be satisfied in a manner in which the wireless access device starts moving or continues moving, the wireless access device first needs to acquire a target direction of the movement, and the wireless access device moves in the target direction.

Further, a manner of determining the target direction includes but is not limited to the following manners. In one implementation manner, the wireless access device determines the target direction according to a parameter of a wireless access link, where the mentioned parameter of the wireless access link may be a parameter of the wireless access link at a current moment, or may be parameters of the wireless access link at a current moment and before the current moment. As mentioned above, the wireless access device satisfies the communication quality requirement of the mobile terminal in the manner of starting moving or continuing moving, where starting moving means that the wireless access device is originally in a static state and needs to move to improve the quality of the wireless access link, and continuing moving means that the wireless access device has already been moving but still needs to continue moving, to further improve the quality of the wireless access link. In both of the foregoing two scenarios, the target direction of the movement needs to be determined. In this embodiment, a target direction of movement of the wireless access device for a first time is called a first target direction, that is, a target direction determined in a process in which the wireless access device changes from a static state to a moving state. In the moving process, the wireless access device may determine a new target direction according to a result of detection of the quality of the second wireless access link, where the determined new target direction is called a second target direction, that is, the target direction determined by the wireless access device in the moving process. The first target direction may be the same as or different from the second target direction. However, a method for determining the first target direction is the same as a method for determining the second target direction. That is, both of the first target direction and the second target direction are determined according to a parameter of the wireless access link between the wireless access device and the mobile terminal. The first target direction is determined according to a parameter of the first wireless access link, and the second target direction is determined according to a parameter of the second wireless access link.

The following describes in detail a process of determining the first target direction.

Step 1: The wireless access device acquires the parameter of the first wireless access link.

The parameter of the first wireless access link may be a parameter of a signal transmitted on the first wireless access link and/or a parameter, related to the first wireless access link, of an antenna and/or location information, related to the first wireless access link, of the mobile terminal, or the like. The parameter of the signal transmitted on the first wireless access link includes strength, a direction, a delay, a TOA, an AOA, or the like of a wireless signal. The parameter, related to the first wireless access link, of the antenna includes a direction of a beam of an antenna used by the mobile terminal for accessing the wireless access device, where the mobile terminal uses the first wireless access link to transmit a signal, and the location information, related to the first wireless access link, of the mobile terminal includes a longitude and latitude location of the mobile terminal, or the like.

The parameter, acquired by the wireless access device, of the first wireless access link may be a parameter of the first wireless access link at a current location at a current moment, or may be a parameter of the first wireless access link within a specific time range, for example, a parameter of the first wireless access link from a few minutes ago to a current moment.

The wireless access device may acquire the parameter of the first wireless access link by in a manner of actively collecting or in a manner of being fed back by the mobile terminal, and the present disclosure sets no limitation thereto.

Step 2: The wireless access device determines the first target direction according to the parameter of the first wireless access link.

The present disclosure includes but is not limited to the following manners of determining the first target direction.

In a first implementation manner, the wireless access device acquires, according to the parameter of the first wireless access link, a direction of the mobile terminal relative to the wireless access device, and the wireless access device determines that the direction of the mobile terminal relative to the wireless access device is the first target direction, where the direction may be determined according to a direction in location information of the mobile terminal relative to the wireless access device, or determined according to a connection line between coordinates of the mobile terminal and coordinates of the wireless access device. The present disclosure sets no limitation to a method for acquiring the direction of the mobile terminal relative to the wireless access device.

A second implementation manner is commonly applied to a scenario in which the wireless access device has a smart antenna, and is described using a directional antenna in the smart antenna as an example. The directional antenna refers to an antenna that transmits and receives extremely strong electromagnetic waves in one or several specific directions but transmits and receives no or few electromagnetic waves in another direction. After a signal is transmitted using a directional antenna, a transmitting area of the signal can be reduced from a circle to a sector such that a direction of the mobile terminal relative to the wireless access device can be determined according to a direction of an antenna beam, thereby improving precision of locating. A wireless access device with a directional antenna may combine a signal strength-based method with a directionality characteristic of the wireless signal, and then obtain the direction of the mobile terminal relative to the wireless access device according to mapping between the wireless access device and the direction of the antenna beam, thereby determining the first target direction. Generally, the first target direction is the direction of the mobile terminal relative to the wireless access device. Referring to Table 1, Table 1 is a mapping table between a beam of the wireless access device and a direction relative to the wireless access device.

TABLE 1

Mapping table between a beam of the wireless access device and a direction relative to the wireless access device

| Beam number | Direction relative to the wireless access device |
| --- | --- |
| Beam 1 | Due east |
| Beam 2 | 30° south of due east |
| ... | |
| Beam n | Due south |

Figure 4:
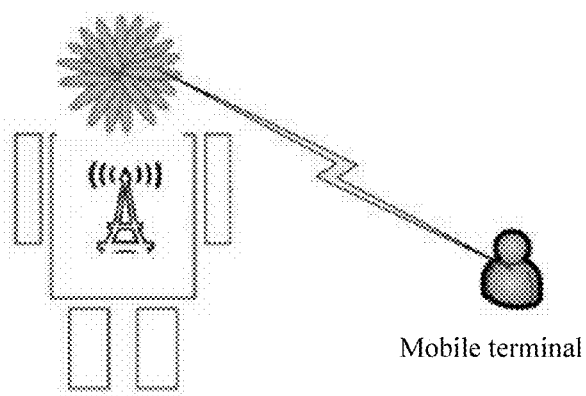
FIG. 4 is a schematic diagram of using a beam of a directional antenna to locate a mobile terminal according to the present disclosure.

Using the foregoing table as an example, it may be determined that the mobile terminal is located in a due east direction relative to the wireless access device if the mobile terminal accesses a wireless network using an antenna beam 1 of the wireless access device, it may be determined that the mobile terminal is located in a direction 30° south of due east relative to the wireless access device if the mobile terminal accesses a wireless network using an antenna beam 2 of the wireless access device. That is, the direction of the mobile terminal relative to the wireless access device may be determined according to the antenna beam of the wireless access device used by the mobile terminal for accessing the wireless network. It may be understood that, the wireless access device stores information indicating a current beam using which the mobile terminal accesses the wireless network. For ease of understanding, the present disclosure further provides a schematic diagram of using a beam or a coverage sector of a directional antenna to locate a mobile terminal. Referring to FIG. 4, FIG. 4 is a schematic diagram of using a beam of a directional antenna to locate a mobile terminal according to the present disclosure, where each antenna beam corresponds to one direction. A sector corresponding to each antenna beam becomes smaller, and a located direction is more precise if there are more antenna beams.

Certainly, the first target direction may also be adjusted with reference to obstacle information in an actual environment.

The direction of the mobile terminal relative to the wireless access device is acquired using the second implementation manner in order to determine the first target direction, which is easy to implement, cost-efficient, and applicable to high-precision locating in a wide indoor area.

A third implementation manner is applicable to, for example, a scenario in which the wireless access device has a multi-antenna array, but is not limited to this scenario. The wireless access device determines, according to angles of arrival of antenna beams transmitted from the mobile terminal to two antennas in the antenna array, the direction of the mobile terminal relative to the wireless access device, and then the wireless access device determines that the direction of the mobile terminal relative to the wireless access device is the first target direction.

The following provides descriptions using an example in which a direction of one mobile terminal relative to the wireless access device is determined.

Further, the direction of the mobile terminal relative to the wireless access device is determined according to angles of arrival of antenna beams transmitted from the mobile terminal to two antennas in the antenna array separately. Because a scattering environment around the mobile terminal is different from that around the wireless access device in wireless communication, antennas at different locations in a multi-antenna system undergo different fading, thereby generating angular dispersion, that is, space-selective fading. Therefore, with introduction of a smart antenna and a multiple input multiple output (MIMO) system, channel information is extended from original two-dimensional information (time and frequency) to three-dimensional information (time, frequency, and space). Therefore, different from a research on a single antenna, in a research on multiple antennas, information about a spatial angle such as an AOA and an angle of departure (AOD) can be fully used in indoor locating. For a wireless local access network (WLAN) system, a multi-antenna array configuration of a wireless access device is increasingly popular. Therefore, a mobile terminal can be located using parameters such as AOAs, TOAs, and time differences of arrival (TDOA) of multiple antennas. A locating algorithm based on a TDOA technology can achieve relatively high locating precision in an environment with Gaussian noise. As the smart antenna array is used in a base station, the base station can obtain, by means of measurement, a relatively precise AOA value when the wireless access device and the mobile terminal are in a line-of-sight (LOS) environment. Using a locating method with mixed use of a TDOA and an AOA, locating precision is further improved in comparison with that in a locating method of using only a TDOA.

Figure 5:
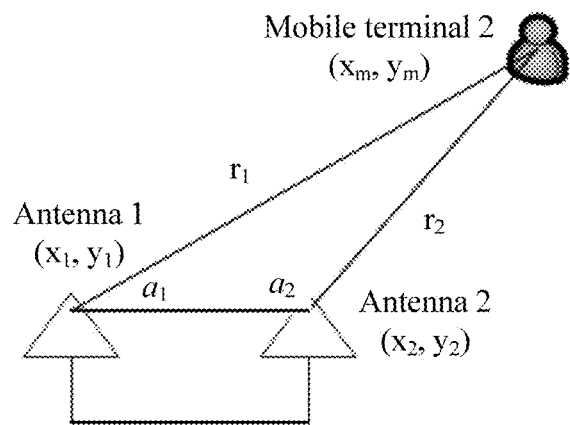
FIG. 5 is a schematic diagram of using angle of arrivals (AOAs) of two antennas for locating according to the present disclosure.

The following provides descriptions using an example in which AOAs of two antennas are used for locating. FIG. 5 is a schematic diagram of using AOAs of two antennas for locating according to the present disclosure. As shown in FIG. 5, three points, namely, an antenna 1, an antenna 2, and a mobile terminal, are respectively three vertices of a triangle, and their coordinates are respectively $(x_1, y_1)$, $(x_2, y_2)$, and $(x_m, y_m)$. A length of a side between the antenna 1 and the mobile terminal is $r_1$, and a length of a side between the antenna 2 and the mobile terminal is $r_2$, where $r_1$ and $r_2$ may be used to determine, according to a TOA, a distance of the mobile terminal relative to the wireless access device. The coordinates $(x_m, y_m)$ of the mobile terminal may be obtained according to the following two formulas:

$$\begin{bmatrix} x_m \\ y_m \end{bmatrix} = \begin{bmatrix} x_1 \\ y_1 \end{bmatrix} - \begin{bmatrix} r_1 \cos\alpha_1 \\ r_1 \sin\alpha_1 \end{bmatrix} \quad (1)$$

$$\begin{bmatrix} x_m \\ y_m \end{bmatrix} = \begin{bmatrix} x_2 \\ y_2 \end{bmatrix} - \begin{bmatrix} r_2 \cos\alpha_2 \\ r_2 \sin\alpha_2 \end{bmatrix}. \quad (2)$$

Figure 6:
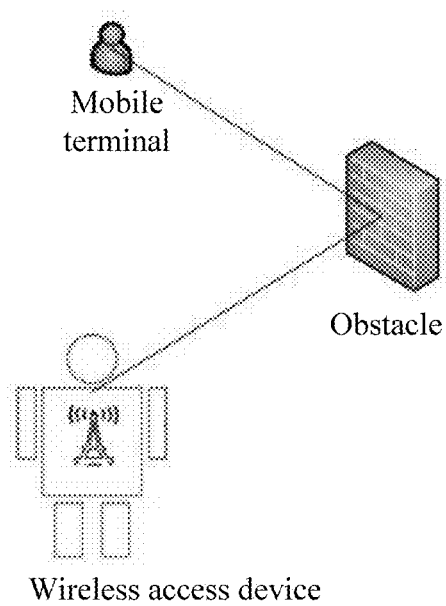
FIG. 6 is a schematic diagram of an AOA obtained by means of reflection from an obstacle according to the present disclosure.

For the third implementation manner, when the wireless access device detects multiple AOAs, a sensor may be further used to acquire environment information to determine which AOA comes directly from the mobile terminal and which AOA is reflected from an obstacle, thereby determining which two AOAs are further used for calculation. A scenario of reflection from an obstacle is shown in FIG. 6. FIG. 6 is a schematic diagram of an AOA obtained by means of reflection from an obstacle according to the present disclosure. By deleting a direction of an interfering AOA that is reflected from an obstacle, the direction of the mobile terminal relative to the wireless access device is accurately estimated, thereby determining the first target direction. Generally, it is determined that the direction of the mobile terminal relative to the wireless access device is the first target direction. Certainly, the first target direction may also be adjusted with reference to obstacle information in an actual environment.

Similarly, the mobile terminal may also be located using a TOA and a TDOA, and a combination of the foregoing multiple wireless signal statistics characteristics. A basic practice is locating the location of the mobile terminal using a locating method in which a geometric equation is solved based on parameters such as a TOA, a direction of arrival (DOA), and received signal strength (RSS), or using a combination of several parameters. A detailed solving process is not described herein again.

Optionally, a more accurate and feasible target direction may be determined according to an environment in which the wireless access device and the mobile terminal are located when the first target direction is determined according to the parameter of the first wireless access link, or after the first target direction is determined according to the parameter of the first wireless access link, the first target direction may be adjusted according to an environment in which the wireless access device and the mobile terminal are located, and the adjusted direction is used as the first target direction. That is, the wireless access device senses, using a sensor, obstacle information in the environment in which the wireless access device and the mobile terminal are located and constructs, according to the obstacle information sensed by the sensor, the environment in which the wireless access device and the mobile terminal are located, and the wireless access device adjusts the first target direction according to the environment in which the wireless access device and the mobile terminal are located.

After the direction of the mobile terminal relative to the wireless access device is determined according to the parameter of the first wireless access link, the wireless access device may directly determine the target direction of movement according to a location of the wireless access device, a sensed obstacle, and obstacle information marked on the map and according to a path planning principle such as a shortest distance if a global detailed map of the environment in which the wireless access device and the mobile terminal are located exists locally on the wireless access device (or the map may be input externally).

Figure 7:
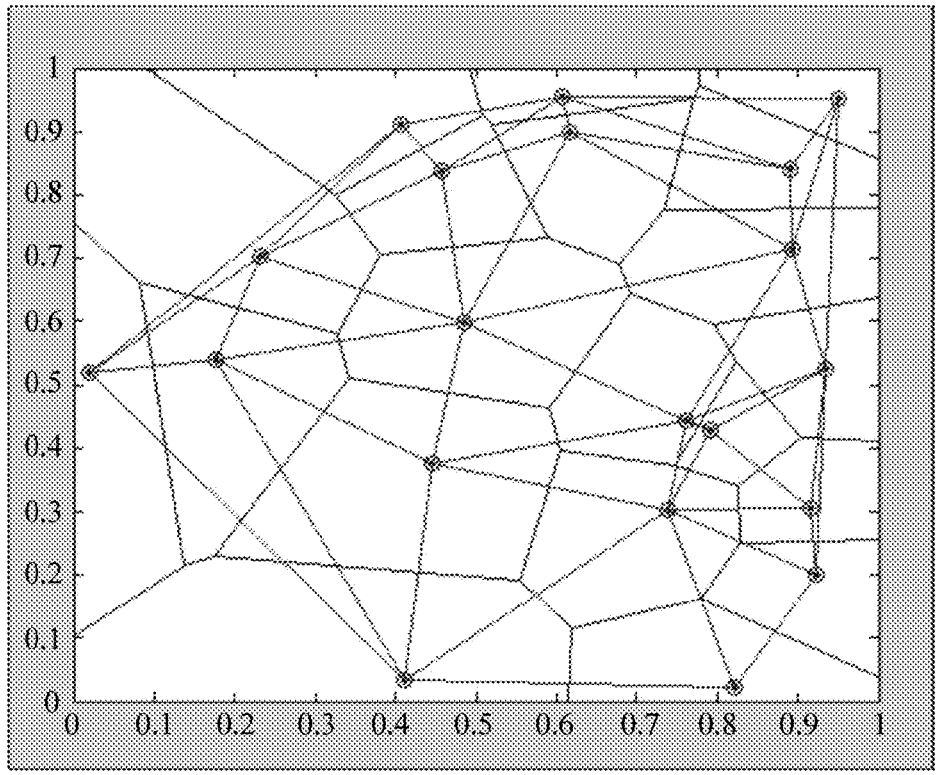
FIG. 7 is a schematic diagram of an environment constructed by a wireless access device by means of sensing using a sensor according to the present disclosure.

The environment in which the wireless access device and the mobile terminal are located may be acquired first if no global detailed map of the environment in which the wireless access device and the mobile terminal are located exists locally on the wireless access device. The wireless access device may sense, using a sensor, obstacle information in the environment in which the wireless access device and the mobile terminal are located, and construct, according to the obstacle information sensed by the sensor, the environment in which the wireless access device and the mobile terminal are located. Furthermore, according to the obstacle information sensed by the sensor, the wireless access device extracts a center of mass of an obstacle on a plan view and uses the center of mass as a vertex, and constructs a Voronoi diagram of a general environment based on a Voronoi diagram theory and using an approximation construction method, which is equivalent to simulating an environment between the wireless access device and the mobile terminal. As shown in FIG. 7, FIG. 7 is a schematic diagram of an environment constructed by a wireless access device by means of sensing using a sensor according to the present disclosure. Circles in the diagram are obstacles sensed by the sensor of the wireless access device in the present disclosure.

Optionally, as described above, the wireless access device continues moving when detecting, in the moving process after the timer expires, that the quality of the second wireless access link does not satisfy the communication quality requirement of the mobile terminal. In the process of continuing moving, a new target direction, that is, the second target direction, may need to be determined.

Furthermore, the wireless access device determines the second target direction according to the parameter of the second wireless access link, and the wireless access device moves in the second target direction when the quality of the second wireless access link does not satisfy the communication quality requirement of the single mobile terminal.

Determining, by the wireless access device, the second target direction according to the parameter of the second wireless access link includes the following several implementation manners.

In a first implementation manner, the wireless access device acquires, according to the parameter of the second wireless access link, a direction of the mobile terminal relative to the wireless access device, and the wireless access device determines that the direction of the mobile terminal relative to the wireless access device is the second target direction.

In a second implementation manner, the wireless access device determines the second target direction according to a direction of an antenna beam used by the mobile terminal for accessing the wireless access device.

In a third implementation manner, the wireless access device determines, according to angles of arrival of antenna beams transmitted from the mobile terminal to two antennas in an antenna array of the wireless access device, a direction of the mobile terminal relative to the wireless access device, and the wireless access device determines that the direction of the mobile terminal relative to the wireless access device is the second target direction.

After the second target direction is determined and before the wireless access device continues moving, the wireless access device may further sense, using a sensor, obstacle information in an environment in which the wireless access device and the mobile terminal are located and construct, according to the obstacle information sensed by the sensor, the environment in which the wireless access device and the mobile terminal are located, and the wireless access device adjusts the second target direction according to the environment in which the wireless access device and the mobile terminal are located.

For a method for determining the foregoing second target direction, reference may be made to the method for determining the first target direction, and details are not described herein again.

It should be noted that when the quality of the second wireless access link does not satisfy the communication quality requirement of the mobile terminal, the following manner may be used to determine whether a new target direction of movement needs to be determined in the process of continuing moving of the wireless access device, that is, whether to continue moving in first target direction or to determine the second target direction and move in the second target direction. The wireless access device determines whether a quantity of times a result of a detection is inferior to a result of a previous detection among results of recent N detections of the quality of the second wireless access link is greater than or equal to a threshold, and the wireless access device determines the second target direction according to the parameter of the second wireless access link if the quantity of times is greater than or equal to the threshold, or the wireless access device continues moving in the first target direction if the quantity of times is less than the threshold.

In this embodiment of the present disclosure, a wireless access device detects whether quality of a first wireless access link satisfies a communication quality requirement of a single mobile terminal. The wireless access device starts moving from a current location if the wireless access device determines that the quality of the first wireless access link does not satisfy the communication quality requirement of the single mobile terminal. In a moving process, the wireless access device may detect whether a second wireless link satisfies the communication quality requirement of the single mobile terminal, and stop moving if the second wireless access link satisfies the communication quality requirement or continue moving if the second wireless access link does not satisfy the communication quality requirement. That is, quality of a wireless access link is improved by means of movement of the wireless access device, thereby satisfying the communication quality requirement of the single mobile terminal.

Figure 8:
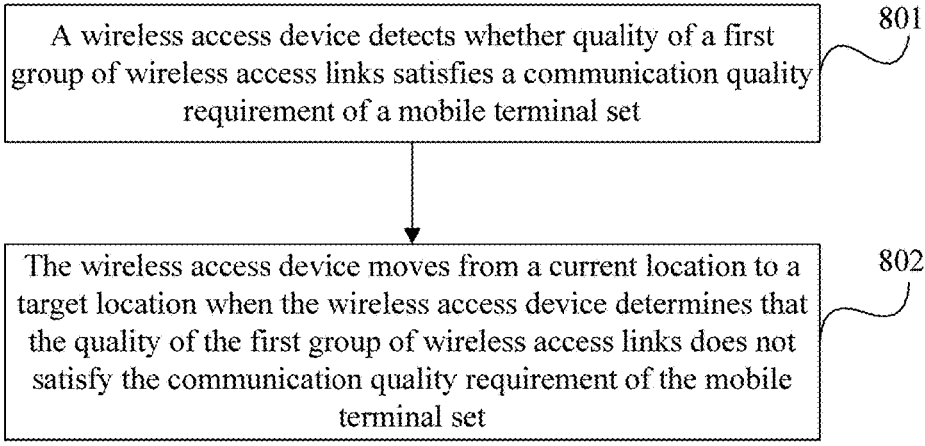
FIG. 8 is a schematic flowchart of Embodiment 2 of a method for wirelessly accessing a service according to the present disclosure.

FIG. 8 is a schematic flowchart of Embodiment 2 of a method for wirelessly accessing a service according to the present disclosure. As shown in FIG. 8, this embodiment is executed by a wireless access device. The wireless access device in this embodiment provides a function of automatic movement, which may be implemented by a robot. The method according to this embodiment is as follows.

Step 801: A wireless access device detects whether quality of a first group of wireless access links satisfies a communication quality requirement of a mobile terminal set.

The first group of wireless access links includes R first wireless access links, where the foregoing first wireless access link is a wireless access link between the wireless access device at a current location and any mobile terminal of R mobile terminals, and the R mobile terminals are R mobile terminals, having a communication quality requirement, of M mobile terminals that access the wireless access device, where M≥1, and 1≤R≤M. That is, some or all of the mobile terminals that access the wireless access device may have a communication quality requirement. In this embodiment of the present disclosure, only a mobile terminal that has a communication quality requirement is considered. For example, the mobile terminals that have a communication quality requirement may be some VIPs for the operator, and generally, the operator may give priority to satisfying the mobile terminals that have a communication quality requirement. Further, the following multiple scenarios may be included. In a first scenario, R>1, and that R>1 includes two cases: one case is M>R, for example, a quantity of mobile terminals that access the wireless access device is 100 (M=100), among which a quantity of mobile terminals that have a communication quality requirement is 80 (R=80), and the other case is R=M, for example, a quantity of mobile terminals that access the wireless access device is 100 (M=100), and all the 100 mobile terminals have a communication quality requirement (R=100). In a second scenario, R=1, and that R=1 includes two cases: one case is M=1, that is, a quantity of mobile terminals that access the wireless access device is 1 (M=1), and this mobile terminal has a communication quality requirement (R=1), and the other case is M>1, for example, a quantity of mobile terminals that access the wireless access device is 100 (M=100), and only 1 mobile terminal has a communication quality requirement (R=1). In this embodiment of the present disclosure, only the mobile terminal that has a communication quality requirement is considered. Therefore, when R>1 and R=1 are separately described in this embodiment of the present disclosure, a total quantity of mobile terminals that access the wireless access device is not limited.

The communication quality requirement of the mobile terminal set is that each terminal of terminals of a preset quantity in the R mobile terminals or all terminals in the R mobile terminals satisfies a communication quality requirement of a single mobile terminal. For example, R=100, the preset quantity is greater than 80, and therefore, it is deemed that the quality of the first group of wireless access links satisfies the communication quality requirement of the mobile terminal set when more than 80 mobile terminals in the 100 mobile terminals satisfy the communication quality requirement of the single mobile terminal, where the communication quality requirement of the single mobile terminal may include at least one of the following: RSSI strength is not less than an RSSI threshold, an access rate is not less than an access rate threshold, an access bandwidth is not less than an access bandwidth threshold, a requirement of a current service type and a requirement of minimum link quality, or the like. For a case in which only one of the mobile terminals that access the wireless access device has a communication quality requirement, that is, a case in which R=1, it may be determined that the first group of wireless access links satisfies the communication quality requirement of the mobile terminal set if the first group of wireless access links satisfies the communication quality requirement of the single mobile terminal.

For a case in which multiple mobile terminals of the mobile terminals that access the wireless access device have a communication quality requirement, that is, a case in which R>1, the communication quality requirement of the mobile terminal set is that a proportion of a quantity of mobile terminals that are in the R mobile terminals and that satisfy the communication quality requirement of the single mobile terminal, to R is greater than a preset value, which may also be understood as a proportion of a quantity of first wireless access links that are in the R first wireless access links and that satisfy the communication quality requirement of the single mobile terminal, to R is greater than the preset value. For example, there are 10 first wireless access links in the first group of wireless access links if R=10. It is assumed that 5 first wireless access links respectively satisfy the communication quality requirements of 5 single mobile terminals, and it is further assumed that the preset value is 80%. In this case, a proportion of a quantity (5) of first wireless access links that are in the 10 first wireless access links and that satisfy the communication quality requirement of the single mobile terminal, to R (10) is 50%, which is less than the preset value, and therefore, it is determined that the quality of the first group of wireless access links does not satisfy the communication quality requirement of the mobile terminal set. It is determined that the first group of wireless access links satisfies the communication quality requirement of the mobile terminal set if a proportion of a quantity of first wireless access links that are in the 10 first wireless access links and that satisfy the communication quality requirement of the single mobile terminal, to R is greater than 80%. It should be noted that a process of determining whether the first wireless access link satisfies the communication quality requirement of the single mobile terminal is the same as a process, in the case in which R=1, of determining whether the quality of the first group of wireless access links satisfies the communication quality requirement of the mobile terminal set, that is, the communication quality requirement of the single mobile terminal is the same as the communication quality requirement of the mobile terminal set in the case in which R=1.

The wireless access device may periodically broadcast its existence, which ensures that there is a mobile terminal accessing the wireless access device in a wireless manner after discovering the wireless access device.

The wireless access device may learn the quality of the first group of wireless access links by means of a periodical detection, which may further be implemented by periodically acquiring a parameter indicating the quality of the first group of wireless access links. For a case in which R=1, the first group of wireless access links is the same as the first wireless access link, and the parameter that can be used to indicate the quality of the first group of wireless access links may be information about an RSSI between the mobile terminal and the wireless access device, information about an access rate and an access bandwidth of a mobile terminal user, a service type of the mobile terminal, or the like. For a case in which R>1, the first group of wireless access links includes R first wireless access links, and the parameter that is used to indicate the quality of the first group of wireless access links may be a proportion, where the proportion is a proportion of a quantity of first wireless access links that are in the R first wireless access links and that satisfy communication quality of the mobile terminal, to R.

Alternatively, quality of the R first wireless access links between the wireless access device and the R mobile terminals may be learned in a manner in which the mobile terminals periodically report parameters. Quality of the first wireless access link is also the quality of the first group of wireless access links when R=1. The wireless access device determines the quality of the first group of wireless access links according to the quality of the R first wireless access links, that is, determines that a proportion of a quantity of first wireless access links that are in the R first wireless access links and that satisfy communication quality of the mobile terminal, to R is the quality of the first group of wireless access links when R>1.

The following provides descriptions using an example in which R=1 and the communication quality requirement of the mobile terminal is that the RSSI strength is not less than an RSSI threshold. When an RSSI, detected by the wireless access device, of the first group of wireless access links is less than the RSSI threshold, it is determined that the quality of the first group of wireless access links does not satisfy the communication quality requirement of the mobile terminal set.

When the mobile terminal set has multiple communication quality requirements, it is determined that the quality of the first group of wireless access links does not satisfy the communication quality requirement of the mobile terminal set if the wireless access device detects that the quality of the first group of wireless access links does not satisfy any of the requirements.

It should be noted that the periodical detection is only one implementation manner. A detection may be performed in another manner according to an actual requirement in the present disclosure, and the present disclosure sets no limitation thereto.

Step 802: The wireless access device moves from a current location to a target location when the wireless access device determines that the quality of the first group of wireless access links does not satisfy the communication quality requirement of the mobile terminal set.

Quality of a second group of wireless access links satisfies the communication quality requirement of the mobile terminal set when the wireless access device moves to the target location, where the second group of wireless access links includes R second wireless access links, and the second wireless access link is a wireless access link between the wireless access device at the target location and any mobile terminal of the R mobile terminals.

In a first implementation manner, the wireless access device is triggered to move from the current location to the target location when the quality of the first group of wireless access links does not satisfy the communication quality requirement of the mobile terminal set.

In a second implementation manner, quality of the first group of wireless access links in a historical time segment is learned, and whether to trigger the wireless access device to move is determined according to the quality of the first group of wireless access links in the historical time segment and a current detection result when the quality of the first group of wireless access links does not satisfy the communication quality requirement of the mobile terminal set. That is, before moving, by the wireless access device, from a current location to a target location, the method further includes determining, by the wireless access device, whether the quality of the first group of wireless access links satisfies the communication quality requirement of the mobile terminal set in recent previous N detections, where N is an integer greater than or equal to 1, and moving, by the wireless access device, from the current location to the target location only when the quality of the first group of wireless access links does not satisfy the communication quality requirement of the mobile terminal set in the recent previous N detections. In this way, unnecessary movement of the wireless access device can be avoided.

The second implementation manner is described using an example. It is assumed that the quality of the first group of wireless access links satisfies the communication quality requirement of the mobile terminal set in all the previous N detections. If it is detected for the first time that the quality of the first group of wireless access links does not satisfy the communication quality requirement of the mobile terminal set, a factor and a condition may be deterioration of the quality of the first group of wireless access links that is caused when an obstacle or an interference source passes through between the wireless access device and the mobile terminal. The quality of the first group of wireless access links may be recovered after the obstacle passes through or the interference source is removed. That is, in such a case, the quality of the first group of wireless access links deteriorates for only a short time and the wireless access device does not need to move. In this way, unnecessary movement of the wireless access device can be avoided. It is assumed that the quality of the first group of wireless access links does not satisfy the communication quality requirement of the mobile terminal set in all the previous N detections, and currently detected quality of the first group of wireless access links still does not satisfy the communication quality requirement of the mobile terminal set, only in this case, the communication quality requirement of the mobile terminal set is satisfied in a manner in which the wireless access device moves from the current location to the target location.

The wireless access terminal first needs to acquire the target location after determining that the communication quality requirement of the mobile terminal set needs to be satisfied in the manner in which the wireless access terminal moves, where one implementation manner is that the wireless access device determines the target location according to parameters of the R first wireless access links, and then, plans a path along which the wireless access device moves from the current location to the target location.

First, the following describes in detail a process of acquiring the target location.

Step 1: The wireless access device acquires, according to the parameters of the R first wireless access links, location information of each of the R mobile terminals relative to the wireless access device.

The parameter of the first wireless access link includes a parameter of a signal transmitted on the first wireless access link and a parameter, related to the first wireless access link, of an antenna, where the parameter of the signal transmitted on the first wireless access link includes strength, a direction, a delay, a TOA, an AOA, and the like of a wireless signal, and the parameter, related to the first wireless access link, of the antenna includes a direction of an antenna beam used by the mobile terminal for accessing the wireless access device, where the mobile terminal uses the first wireless access link to transmit a signal. When there are multiple wireless links, the parameter further includes distribution condition statistics obtained according to characteristics of related parameters such as the RSSI, a radio wave direction, and a distance between two communications end, where the related parameters are obtained according to characteristics such as the strength, the direction, and the delay of the foregoing wireless signal, and the distribution condition statistics may be used to perform location estimation or the like.

The location information refers to a direction and/or a distance of the mobile terminal relative to the wireless access device. That is, the location information of the mobile terminal relative to the wireless access device may be determined according to the direction and/or the distance of the mobile terminal relative to the wireless access device. Certainly, the location information may also be coordinates information of the mobile terminal.

Methods for determining location information of all mobile terminals in the R mobile terminals relative to the wireless access device are the same in the present disclosure. Therefore, detailed descriptions are provided herein only using a method for determining location information of one mobile terminal relative to the wireless access device as an example. A method for determining location information of another mobile terminal relative to the wireless access device is similar and is not described herein again.

The present disclosure includes but is not limited to the following two manners of determining a location of the mobile terminal relative to the wireless access device.

A first implementation manner is commonly applied to a scenario in which the wireless access device has a smart antenna, and is described using a directional antenna in the smart antenna as an example. The directional antenna refers to an antenna that transmits and receives extremely strong electromagnetic waves in one or several specific directions but transmits and receives no or few electromagnetic waves in another direction. After a signal is transmitted using a directional antenna, a transmitting area of the signal can be reduced from a circle to a sector such that a direction of the mobile terminal relative to the wireless access device can be determined according to a direction of an antenna beam, thereby improving precision of locating. A wireless access device with a directional antenna may combine a signal strength-based method with a directionality characteristic of the wireless signal, and then obtain the direction of the mobile terminal relative to the wireless access device according to mapping between the wireless access device and the direction of the antenna beam, as shown in Table 1. For Table 1, refer to Table 1 in the embodiment shown in FIG. 3, and Table 1 is not drawn herein again. Using Table 1 as an example, it may be determined that the mobile terminal is located in a due east direction relative to the wireless access device if the mobile terminal accesses a wireless network using an antenna beam 1 of the wireless access device, it may be determined that the mobile terminal is located in a direction 30° south of due east relative to the wireless access device if the mobile terminal accesses a wireless network using an antenna beam 2 of the wireless access device. That is, the direction of the mobile terminal relative to the wireless access device may be determined according to the antenna beam of the wireless access device used by the mobile terminal for accessing the wireless network. It may be understood that, the wireless access device stores information indicating a current beam using which the mobile terminal accesses the wireless network. For ease of understanding, the present disclosure further provides a schematic diagram of using a beam or a coverage sector of a directional antenna to locate a mobile terminal. Referring to FIG. 4, FIG. 4 is a schematic diagram of using a beam of a directional antenna to locate a mobile terminal according to the present disclosure, where each antenna beam corresponds to one direction. A sector corresponding to each antenna beam becomes smaller, and a located direction is more precise if there are more antenna beams.

The wireless access device receives a signal using the directional antenna, and the wireless access device estimates, using the signal received by the wireless access device, a distance of the mobile terminal relative to the wireless access device in order to acquire the location information of the mobile terminal. For example, the wireless access device may determine, according to a TOA, the distance of the mobile terminal relative to the wireless access device.

The first implementation manner used to acquire the location information of the mobile terminal relative to the wireless access device is easy to implement, cost-efficient, and applicable to high-precision locating in a wide indoor area.

A second implementation manner is applicable to, for example, a scenario in which the wireless access device has a multi-antenna array, but is not limited to this scenario. The wireless access device determines, according to angles of arrival of each of the R mobile terminals at two antennas in the antenna array, a direction and a distance of each of the R mobile terminals relative to the wireless access device.

Similarly, the following provides descriptions using an example in which a direction and a distance of one mobile terminal relative to the wireless access device are determined. A method for determining a direction and a distance of another mobile terminal relative to the wireless access device is similar and is not described herein again.

Further, the direction and the distance of the mobile terminal relative to the wireless access device are determined according to angles of arrival of antenna beams transmitted from the mobile terminal to two antennas in the antenna array separately. Because a scattering environment around the mobile terminal is different from that around the wireless access device in wireless communication, antennas in different locations in a multi-antenna system undergo different fading, thereby generating angular dispersion, that is, space-selective fading. Therefore, with introduction of a smart antenna and a MIMO system, channel information is extended from original two-dimensional information (time and frequency) to three-dimensional information (time, frequency, and space). Therefore, different from a research on a single antenna, in a research on multiple antennas, information about a spatial angle such as an AOA and an AOD can be fully used in indoor locating. For a WLAN system, a multi-antenna array configuration of a wireless access device is increasingly popular. Therefore, a mobile terminal can be located using parameters such as AOAs, TOAs, and TDOAs of multiple antennas. A locating algorithm based on a TDOA technology can achieve relatively high locating precision in an environment with Gaussian noise. As the smart antenna array is used in a base station, when the wireless access device and the mobile terminal are in an LOS environment, the base station can obtain, by means of measurement, a relatively precise AOA value. Using a locating method with mixed use of a TDOA and an AOA, locating precision is further improved in comparison with that in a locating method of using only a TDOA.

The following provides descriptions using an example in which AOAs of two antennas are used for locating. FIG. 5 is a schematic diagram of using AOAs of two antennas for locating according to the present disclosure. As shown in FIG. 5, three points, namely, an antenna 1, an antenna 2, and a mobile terminal, are respectively three vertices of a triangle, and their coordinates are respectively $(x_1, y_1)$, $(x_2, y_2)$, and $(x_m, y_m)$. A length of a side between the antenna 1 and the mobile terminal is $r_1$, and a length of a side between the antenna 2 and the mobile terminal is $r_2$, where $r_1$ and $r_2$ may be used to determine, according to a TOA, a distance of the mobile terminal relative to the wireless access device. The coordinates $(x_m, y_m)$ of the mobile terminal may be obtained according to Formula (1) and Formula (2) in the embodiment shown in FIG. 3.

For the second implementation manner, a sensor may be further used to acquire environment information to determine which AOA comes directly from the mobile terminal and which AOA is reflected from an obstacle when the wireless access device detects multiple AOAs, thereby determining which two AOAs are further used for calculation. A scenario of reflection from an obstacle is shown in FIG. 6. FIG. 6 is a schematic diagram of an AOA obtained by means of reflection from an obstacle according to the present disclosure. A user location is accurately estimated by deleting a direction of an interfering AOA that is reflected from an obstacle.

Similarly, the mobile terminal may also be located using a TOA and a TDOA, and a combination of the foregoing multiple wireless signal statistics characteristics. A basic practice is locating the location of the mobile terminal using a locating method in which a geometric equation is solved based on parameters such as a TOA, a DOA, and RSS, or using a combination of several parameters. A detailed solving process is not described herein again.

Step 2: The wireless access device determines the target location according to the location information of the R mobile terminals relative to the wireless access device.

Optionally, a more accurate and feasible target location may be determined according to an environment in which the wireless access device and the R mobile terminals are located when the target location is determined according to the location information of the R mobile terminals relative to the wireless access device, or after the target location is determined according to the location information of the R mobile terminals relative to the wireless access device, the foregoing target location may be adjusted according to an environment in which the wireless access device and the R mobile terminals are located, to obtain an adjusted target location.

After the location information of the R mobile terminals relative to the wireless access device is determined, the wireless access device may directly determine the target location of movement according to a location of the wireless access device, a sensed obstacle, and obstacle information marked on the map and according to a path planning principle such as a shortest distance if a global detailed map of the environment in which the wireless access device and the R mobile terminals are located exists locally on the wireless access device (or the map may be input externally). The target location may be further identified using information such as a direction, coordinates, time, and a speed.

The environment in which the wireless access device and the R mobile terminals are located may be acquired first if no global detailed map of the environment in which the wireless access device and the R mobile terminals are located exists locally on the wireless access device. The wireless access device may sense, using a sensor, obstacle information in the environment in which the wireless access device and the R mobile terminals are located, and construct, according to the obstacle information sensed by the sensor, the environment in which the wireless access device and the R mobile terminals are located. Furthermore, according to the obstacle information sensed by the sensor, the wireless access device extracts a center of mass of an obstacle on a plan view and uses the center of mass as a vertex, and constructs a Voronoi diagram of a general environment based on a Voronoi diagram theory and using an approximation construction method, which is equivalent to simulating an environment between the wireless access device and the mobile terminal. As shown in FIG. 7, FIG. 7 shows an environment constructed by a wireless access device by means of sending using a sensor according to the present disclosure. Circles in the diagram are obstacles sensed by the sensor of the wireless access device in the present disclosure.

Optionally, the wireless access device may perform a local simulation to determine whether a second group of wireless access links can satisfy the communication quality requirement of the mobile terminal set after the wireless access device moves to the target location if a computing capability of the wireless access device permits. The wireless access device triggers the wireless access device to perform movement to the target location if the second group of wireless access links can satisfy the communication quality requirement of the mobile terminal set after the wireless access device moves to the target location, the wireless access device re-plans a target location if the second group of wireless access links cannot satisfy the communication quality requirement of the mobile terminal set after the wireless access device moves to the target location.

Subsequently, the following describes a process of planning a path along which the wireless access device moves from the current location to the target location.

After the target location is determined, the current location and the target location of the wireless access device are put into a Voronoi diagram to form a collision-free path network of movement of the wireless access device. An obstacle is approximated as a mass point such that a probability that the wireless access device bumps into an obstacle is smallest when moving along a Voronoi side of obstacles in the environment. Alternatively, information about a path from the current location to the target location is planned in another manner. The information about the path may be coordinates of a point of the target location, or a direction represented by an angle, or coordinates of multiple continuous points between the current location and the target location, or a continuous movement time and a movement speed in a specific direction, or the like. Briefly, in the path planning, only a location or a direction of a next point of movement of the wireless access device may be planned, but a movement path of the wireless access device is not planned. The wireless access device locates a spatial location P (r, è), that is, a point at a distance of r in an è direction of local coordinates of the wireless access device, of the mobile terminal using the foregoing multiple mobile terminal locating mechanisms. The foregoing coordinates are two-dimensional coordinates, and in a planar mechanical apparatus such as an access point apparatus driven by a wheel, no further coordinates conversion is required, and the information may be used directly for subsequent processing. The coordinates may be converted, with reference to information such as height of the wireless access device, into coordinates P' (x', y', z') that can be recognized by a mechanical control unit when the location needs to be converted into a location in three-dimensional space. A converted target location is placed into a local map that is currently stored in the wireless access device, where the map includes environment information such as obstacle information sensed by a sensor module.

The planned path information (namely, information about the target location) may be represented in the following manners.

1. Direction: T1 ($\alpha$), that is, the wireless access device moves in an $\alpha$ direction of a coordinate system in which the current location of the wireless access device is an origin of the coordinate system;

2. A direction+distance manner: T1 ($\alpha$, L), that is, the wireless access device translates a distance of L in an $\alpha$ direction of a coordinate system in which the current location of the wireless access device is an origin of the coordinate system;

3. Direction+time: T1 ($\alpha$, t), that is, the wireless access device moves for a time oft in an $\alpha$ direction of a coordinate system in which the current location of the wireless access device is an origin of the coordinate system;

4. A direction+speed+time manner: T2 ($\alpha$, v, t), that is, the wireless access device moves at a speed of v for a time of t in an $\alpha$ direction of a coordinate system in which the current location of the wireless access device is an origin of the coordinate system and then stops, where because there is planning information of the speed, not only the location information of the mobile terminal needs to be acquired, but also the movement speed of the wireless access device needs to be predicted according to a location variation pattern;

5. A target point location manner: T3 (x, y, z), that is, the wireless access device moves to a point whose spatial coordinates are (x, y, z) and then stops; or 6. A continuous path including multiple points: a combination of the foregoing multiple manners, or a specific manner, which differs in that the continuous path includes information about points of multiple steps of movement.

After the path information is planned, and after the wireless access device moves to the target location according to the path information, the wireless access device receives a result of comparing the quality of the second group of wireless access links with the quality, obtained before the movement, of the first group of wireless access links, where the result is fed back by the wireless access device, and the wireless access device determines a target location of next movement according to the result of comparing and a parameter of the second wireless access link. That is, after moving to the target location, the wireless access device performs a comparison to determine whether a wireless access link obtained after the movement satisfies the communication quality requirement of the mobile terminal set, and feeds back feedback information indicating successful planning if the wireless access link satisfies the communication quality requirement, or feeds back feedback information indicating planning failure such that the wireless access device further plans a path if the wireless access link does not satisfy the communication quality requirement.

In this embodiment of the present disclosure, a wireless access device detects whether quality of a first group of wireless access links satisfies a communication quality requirement of a mobile terminal set. The wireless access device moves from a current location to a target location if the wireless access device determines that the quality of the first group of wireless access links does not satisfy the communication quality requirement of the mobile terminal set such that a second group of wireless access links obtained after the movement satisfies the communication quality requirement of the mobile terminal set. That is, quality of a wireless access link is improved by means of movement of the wireless access device, thereby satisfying the communication quality requirement of the mobile terminal set.

Figure 9:
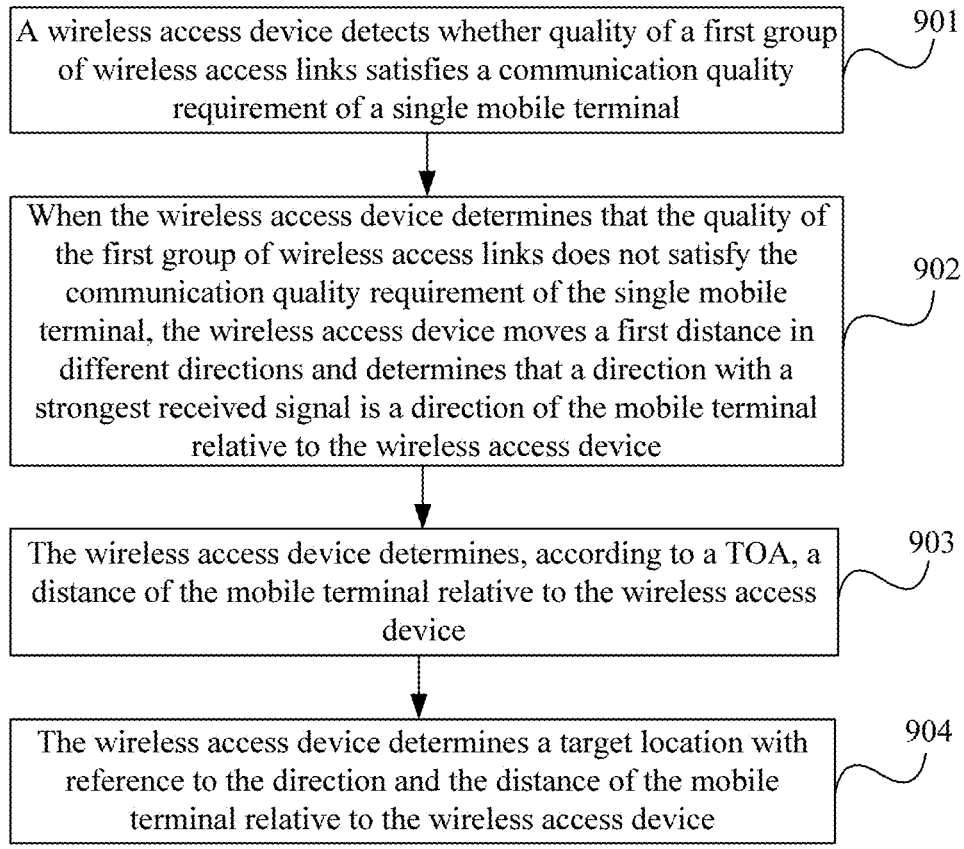
FIG. 9 is a schematic flowchart of Embodiment 3 of a method for wirelessly accessing a service according to the present disclosure.

FIG. 9 is a schematic flowchart of Embodiment 3 of a method for wirelessly accessing a service according to the present disclosure. This embodiment is pertinent to a scenario shown in FIG. 1, that is, a case in which only one mobile terminal in mobile terminals that access a wireless access device has a communication quality requirement, namely, a case in which R=1. As shown in FIG. 9, the method in this embodiment includes the following steps.

Step 901: A wireless access device detects whether quality of a first group of wireless access links satisfies a communication quality requirement of a single mobile terminal.

This step is similar to step 801 in the embodiment shown in FIG. 8, and is not described herein again.

Step 902: When the wireless access device determines that the quality of the first group of wireless access links does not satisfy the communication quality requirement of the single mobile terminal, the wireless access device moves a first distance in different directions and determines that a direction with a strongest received signal is a direction of the mobile terminal relative to the wireless access device.

Figure 10:
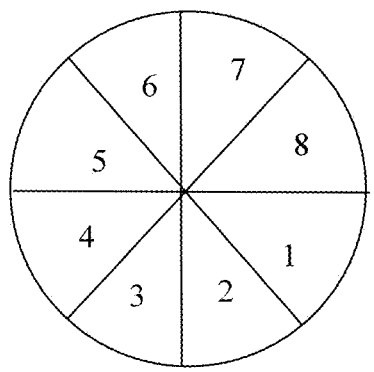
FIG. 10 is a schematic diagram of dividing a two-dimensional plane in which a wireless access device is located into fixed areas according to the present disclosure.

Referring to FIG. 10, FIG. 10 is a schematic diagram of dividing a two-dimensional plane in which a wireless access device is located into fixed areas according to the present disclosure. The wireless access device divides the two-dimensional plane in which the wireless access device is located into 8 fixed areas, that is, into 8 directions. The wireless access device moves the first distance (generally extremely short) in different directions, compares received signal strength in the directions, and determines that a direction with a strongest received signal is the direction of the mobile terminal relative to the wireless access device.

Step 903: The wireless access device determines, according to a TOA, a distance of the mobile terminal relative to the wireless access device.

That is, a length of a transmission path of a signal, that is, a distance between the wireless access device and the mobile terminal, is obtained according to a transmission rate and time of the signal.

Step 904: The wireless access device determines a target location with reference to the direction and the distance of the mobile terminal relative to the wireless access device.

Reference may be made to the detailed description in the embodiment shown in FIG. 8, and details are not described herein again.

The wireless access device moves from a current location to the target location.

The movement is performed according to a mechanical movement principle, which is not described herein in detail.

Optionally, after the wireless access device moves to the target location, an effect of path planning (quality of a second group of wireless access links between the wireless access device at the target location and the mobile terminal) may further be fed back such that the wireless access device determines a target location of next movement according to the effect that is fed back.

This embodiment is pertinent to a scenario in which only one wireless access device has a communication quality requirement. A wireless access device tries to move in different directions, determines, according to received signal strength, a direction of a mobile terminal relative to the wireless access device, and then determines, according to a TOA or the like, a distance of the mobile terminal relative to the wireless access device, and further, determines a target location according to the direction and the distance of the mobile terminal relative to the wireless access device.

Figure 11:
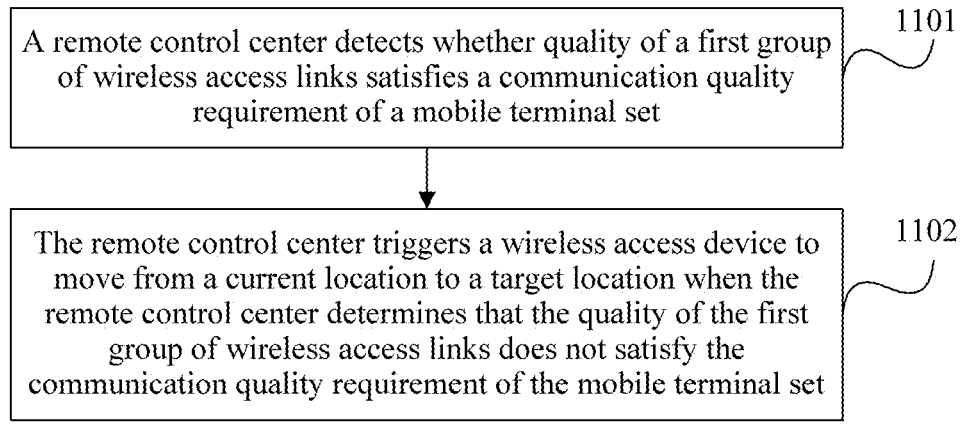
FIG. 11 is a schematic flowchart of Embodiment 4 of a method for wirelessly accessing a service according to the present disclosure.

FIG. 11 is a schematic flowchart of Embodiment 4 of a method for wirelessly accessing a service according to the present disclosure. The embodiment shown in FIG. 11 is performed by a remote control center. As shown in FIG. 11, the method in this embodiment is as follows.

Step 1101: A remote control center detects whether quality of a first group of wireless access links satisfies a communication quality requirement of a mobile terminal set.

The first group of wireless access links includes R first wireless access links, where the first wireless access link is a wireless access link between a wireless access device at a current location and any mobile terminal of R mobile terminals, and the R mobile terminals are R mobile terminals of M mobile terminals that access the wireless access device, where M≥1, and 1≤R≤M.

For a detailed description of this step, reference may be made to step 801. A difference lies in that step 801 is executed by a wireless access device, but this step is executed by a remote control center. However, implemented functions are the same, and are not described herein again.

Step 1102: The remote control center triggers a wireless access device to move from a current location to a target location when the remote control center determines that the quality of the first group of wireless access links does not satisfy the communication quality requirement of the mobile terminal set.

Quality of a second group of wireless access links satisfies the communication quality requirement of the mobile terminal set when the wireless access device moves to the target location, where the second group of wireless access links includes R second wireless access links, and the second wireless access link is a wireless access link between the wireless access device at the target location and any mobile terminal of the R mobile terminals.

For a detailed description of this step, reference may be made to step 802. A difference lies in that step 802 is executed by a wireless access device, but this step is executed by a remote control center. However, implemented functions are the same, and are not described herein again.

In this embodiment of the present disclosure, a remote control center detects whether quality of a first group of wireless access links satisfies a communication quality requirement of a mobile terminal set. The remote control center triggers a wireless access device to move from a current location to a target location such that a second group of wireless access links obtained after the movement satisfies the communication quality requirement of the mobile terminal set if the remote control center determines that the quality of the first group of wireless access links does not satisfy the communication quality requirement of the mobile terminal set. That is, quality of a wireless access link is improved by means of movement of the wireless access device, thereby satisfying the communication quality requirement of the mobile terminal set.

Figure 12:
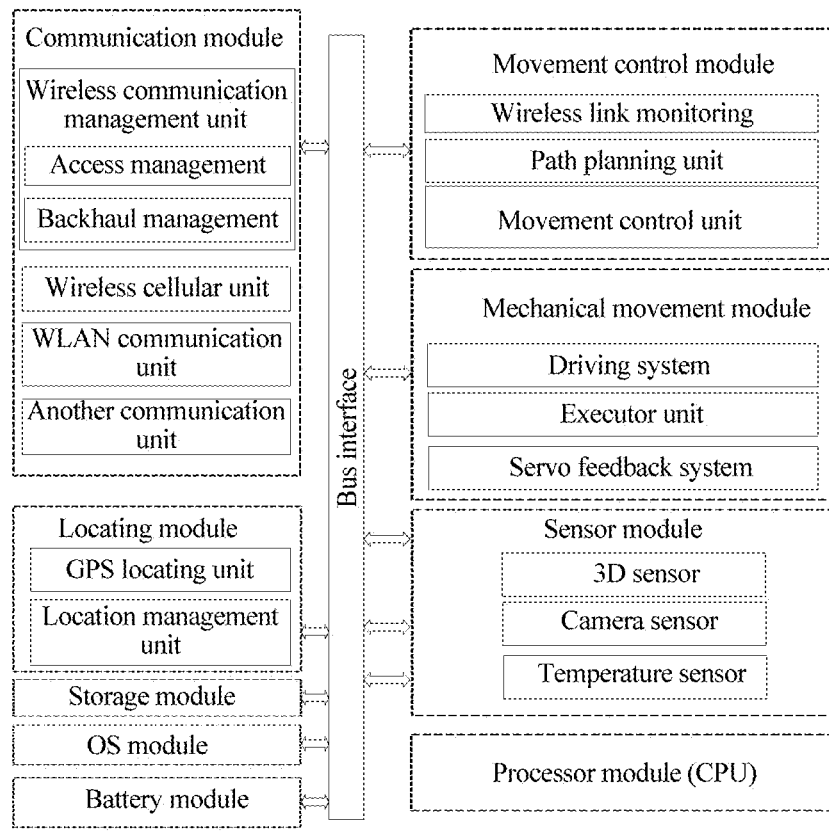
FIG. 12 is a schematic structural diagram of Embodiment 1 of a device for wirelessly accessing a service according to the present disclosure.

FIG. 12 is a schematic structural diagram of Embodiment 1 of a device for wirelessly accessing a service according to the present disclosure. As shown in FIG. 12, the device in this embodiment includes a communication module, a movement control module, a mechanical movement module, a locating module, a storage module, an operating system (OS) module, a battery module, a sensor module, and a processor module. A structure of the embodiment shown in FIG. 12 is a preferable structure, where the communication module, the movement control module, and the mechanical movement module are mandatory modules of the wireless access device of the present disclosure, but other modules are optional modules.

The following describes in detail functions of the modules in the embodiment shown in FIG. 12.

The communication module provides a wireless communication mode such as a wireless cell or a WLAN, and includes a wireless communication management unit, a wireless cellular unit, a WLAN communication unit, and another communication unit, where the wireless communication management unit manages a mobile terminal that accesses the wireless access device (access management) and manages a backhaul link in which traffic of the wireless access device is forwarded to the Internet (backhaul management). The access management is performed in a wireless communication mode, and the backhaul management may be performed in a wireless or wired manner (the access management in the wired manner does not require too many management functions). The wireless cellular unit provides a wireless cellular communication mode, the WLAN communication unit provides a WLAN communication mode, and another communication unit provides another communication mode.

The locating module includes a global positioning system (GPS) locating unit and a location management unit. The GPS locating unit is used by the wireless access device to acquire location information of the wireless access device. The location management unit is configured to acquire and manage location information of the mobile terminal that accesses the wireless access device, and information about the locating module can assist the movement control module and the mechanical movement module to perform control determination, path planning, and the like.

The OS module is configured to manage hardware and software resources of the wireless access device, for example, manage and configure a memory and a storage, decide an order of preference of system resource supply and demands, control an input and output device, operate a network, manage a file system, and perform another basic transaction. An OS also provides an operation interface for interaction between a user and a system. The OS comes in many types, and OSs installed on different devices range from simple OS to complex OS, and range from an embedded system in a mobile phone to a large OS of a supercomputer. Many OS manufacturers have different definitions on a scope of an OS. For example, some operating systems are integrated with a graphical user interface (GUI), and some use only a command-line interface (CLI) and regard a GUI as an unessential application.

The battery module provides electrical power for other modules of the wireless access device.

The processor module is configured to process an instruction, execute an operation, control time, and process data. A central processing unit (CPU) extracts an instruction from a storage or a cache, places the instruction into an instruction register, and decodes the instruction. The CPU parses the instruction into a series of micro-operations, and then issues various control commands and executes the micro-operation series in order to complete execution of the instruction. The instruction is a basic instruction for executing a type and an operand of an operation. An instruction consists of one byte or multiple bytes, which include an operation code field, one or more fields related to an operand address, and some status words and feature codes that represent a machine status. Some instructions also include an operand directly.

The storage module is configured to store data and can provide a part, a device, and a computer system of corresponding data according to an operation request. Essentially, a storage system enables information to be lasted in terms of time so that the information does not disappear, and a storage system of the wireless access device keeps digitalized information in a medium so that the information is accessible in a timely manner when required.

The movement control module includes a wireless link monitoring unit that is configured to analyze a status of an access user and/or a backhaul communication link/network, and determine, with reference to a preset threshold parameter, whether to trigger the mechanical movement module to perform location adjustment to better satisfy a user requirement. The wireless access link monitoring unit finally generates an elementary control command and transmits the elementary control command to the mechanical movement module to trigger a working process of the mechanical movement module. The movement control module further includes a path planning unit and a movement control unit. The path planning unit (which plans a single point, where a distance between two points, namely, a current location and a target location is also a path but is not necessarily a line) and the movement control unit are a command center of the wireless access device and are responsible for processing a work instruction and information about internal and external environments, making a decision according to a preset ontology model, an environment model, and a control program, generating a corresponding control signal, and using a driving system unit to drive each component of an executor unit to move according to a determined order, track, speed, and acceleration, to accomplish a specified task. A general requirement on a wireless access control system is to implement functions of controlling a location, a speed, an acceleration, and the like of the wireless access device, and also implement functions of planning and controlling a track for a wireless access device that moves in a continuous track. These two units receive a control instruction sent by the wireless access link monitoring unit. The path planning unit includes a planning manner of planning a next target movement point. An objective of path planning is to find a collision-free path for the wireless access device according to a parameter of a wireless access link between the mobile terminal and the wireless access device and a communication quality requirement of a mobile terminal set with reference to ambient environment information, where the path can improve wireless access communication quality in a quickest way. Main content of the path planning includes target locating, movement modeling, environment modeling, and path searching.

The mechanical movement module is a main part for an access point to implement a free movement function, and includes a driving system, an executor unit, and a servo feedback system. The executor unit may be a moving vehicle, an aircraft, or a wall-climbing apparatus with a strong attaching capability, or the like. The executor unit is a main part of the mechanical movement module of the wireless access device, and may consist of a connecting rod, a moveable joint, and another part, and is configured to execute a task. Generally, an action of the executor unit is directly controlled by a wireless access device controller (movement control+driving system). The executor unit is driven by the driving system. Common driving devices include a servo motor, a stepper motor, a cylinder, a hydraulic cylinder, and the like, and some new types of drivers. They are controlled by a controller of the movement control module. The servo feedback unit performs an evaluation and feedback on a result obtained after the wireless access device moves to the target location in order to provide guidance for the movement path planning unit in performing subsequent path planning and the movement control unit in performing movement control.

The sensor module provides a function of detecting and sensing an external environment, and may include sensors of various types such as a temperature sensor, a camera sensor, an obstacle sensor (three-dimensional (3D) sensor) to implement the functions of this unit. Functions of modules in FIG. 12 are in communication with each other using the bus interface.

Figure 13:
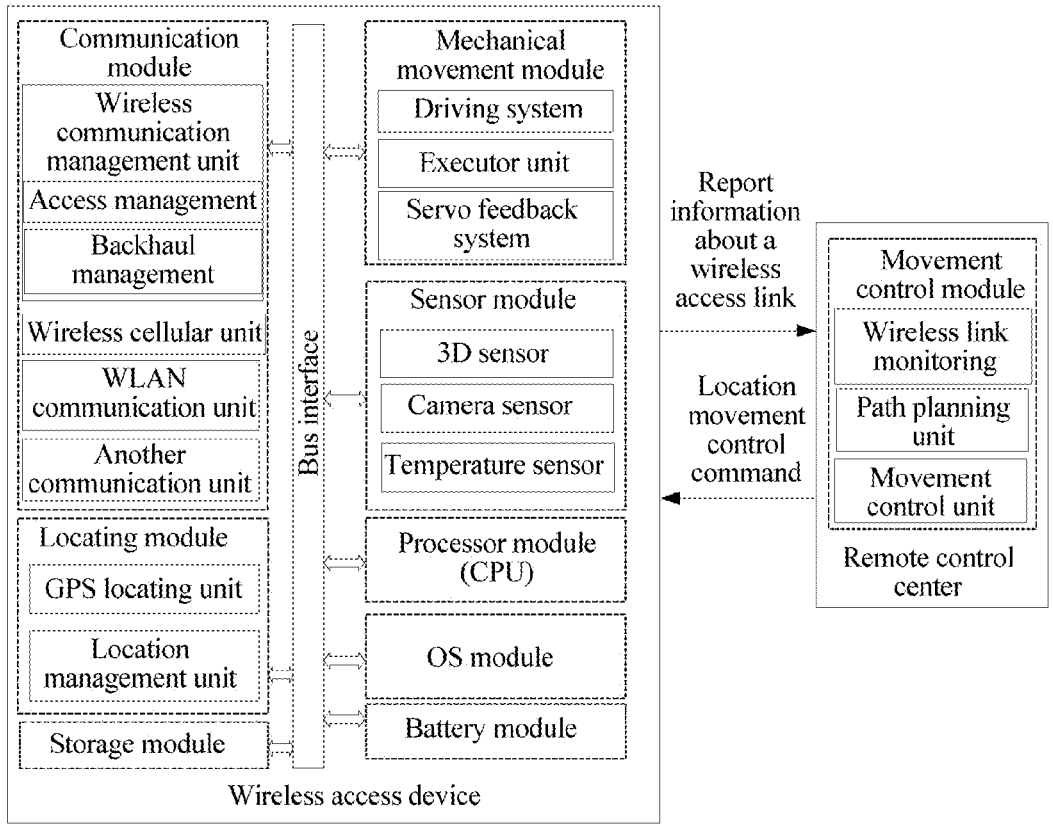
FIG. 13 is a schematic structural diagram of Embodiment 2 of a device for wirelessly accessing a service according to the present disclosure.

FIG. 13 is a schematic structural diagram of Embodiment 2 of a device for wirelessly accessing a service according to the present disclosure. As shown in FIG. 13, an embodiment shown in FIG. 13 differs from the embodiment shown in FIG. 12 in the following. In the embodiment shown in FIG. 13, a movement control module is at a remote control center, a wireless access device reports wireless link information to the remote control center for the remote control center to perform path planning, and the remote control center sends a location movement control command to the wireless access device. Functions of modules in FIG. 13 are in communication with each other using the bus interface. Functions of modules in FIG. 13 are the same as those shown in FIG. 12, and are not described herein again.

Figure 14:
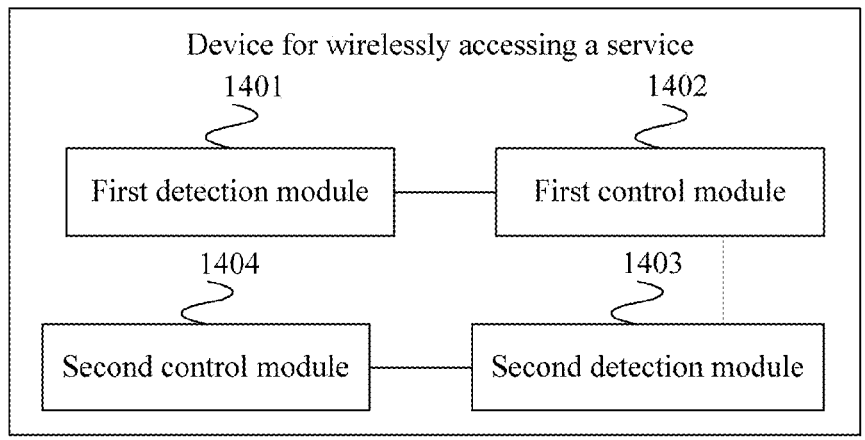
FIG. 14 is a schematic structural diagram of Embodiment 3 of a device for wirelessly accessing a service according to the present disclosure.

FIG. 14 is a schematic structural diagram of Embodiment 3 of a device for wirelessly accessing a service according to the present disclosure. The device for wirelessly accessing a service is a wireless access device. As shown in FIG. 14, the wireless access device in this embodiment includes a first detection module 1401, a first control module 1402, a second detection module 1403, and a second control module 1404. The first detection module 1401 and the second detection module 1403 may be a same detection module, and the first control module 1402 and the second control module 1404 may be a same control module. The first detection module 1401 is configured to detect whether quality of a first wireless access link satisfies a communication quality requirement of a single mobile terminal, where the first wireless access link is a wireless access link between the wireless access device at a current location and the mobile terminal. The first control module 1402 is configured to control the wireless access device to start moving when the wireless access device determines that the quality of the first wireless access link does not satisfy the communication quality requirement of the single mobile terminal. The second detection module 1403 is configured to detect, in a moving process of the wireless access device, whether quality of a second wireless access link satisfies the communication quality requirement of the single mobile terminal, where the second wireless access link is a wireless access link between the wireless access device at a location after the movement and the mobile terminal. The second control module 1404 is configured to control the wireless access device to stop moving when the quality of the second wireless access link satisfies the communication quality requirement of the single mobile terminal, or control the wireless access device to continue moving when the quality of the second wireless access link does not satisfy the communication quality requirement of the single mobile terminal.

In the foregoing embodiment, the second detection module 1403 is further configured to set a periodical detection timer in the moving process of the wireless access device, and enable a detection of whether the quality of the second wireless access link satisfies the communication quality requirement of the single mobile terminal when the timer expires.

In the foregoing embodiment, the first control module 1402 is further configured to control the wireless access device to determine a first target direction according to a parameter of the first wireless access link when the first detection module 1401 determines that the quality of the first wireless access link does not satisfy the communication quality requirement of the single mobile terminal, and control the wireless access device to start moving in the first target direction.

In the foregoing embodiment, the first control module 1402 is further configured to control the wireless access device to acquire, according to the parameter of the first wireless access link, a direction of the mobile terminal relative to the wireless access device, and control the wireless access device to determine that the direction of the mobile terminal relative to the wireless access device is the first target direction.

In the foregoing embodiment, the first control module 1402 is further configured to control the wireless access device to determine the first target direction according to a direction of an antenna beam used by the mobile terminal for accessing the wireless access device.

In the foregoing embodiment, the first control module 1402 is further configured to control the wireless access device to determine, according to angles of arrival of antenna beams transmitted from the mobile terminal to two antennas in an antenna array of the wireless access device, a direction of the mobile terminal relative to the wireless access device, and control the wireless access device to determine that the direction of the mobile terminal relative to the wireless access device is the first target direction.

In the foregoing embodiment, the second control module 1404 is further configured to control the wireless access device to determine a second target direction according to a parameter of the second wireless access link, and control the wireless access device to move in the second target direction.

In the foregoing embodiment, the second control module 1404 is further configured to control the wireless access device to acquire, according to the parameter of the second wireless access link, a direction of the mobile terminal relative to the wireless access device, and control the wireless access device to determine that the direction of the mobile terminal relative to the wireless access device is the second target direction.

In the foregoing embodiment, the second control module 1404 is further configured to control the wireless access device to determine the second target direction according to a direction of an antenna beam used by the mobile terminal for accessing the wireless access device.

In the foregoing embodiment, the second control module 1404 is further configured to control the wireless access device to determine, according to angles of arrival of antenna beams transmitted from the mobile terminal to two antennas in an antenna array of the wireless access device, a direction of the mobile terminal relative to the wireless access device, and control the wireless access device to determine that the direction of the mobile terminal relative to the wireless access device is the second target direction.

In the foregoing embodiment, the second control module 1404 is further configured to control the second detection module to determine whether a quantity of times a result of a detection is inferior to a result of a previous detection among results of recent N detections of the quality of the second wireless access link is greater than or equal to a threshold, and control the wireless access device to determine the second target direction according to the parameter of the second wireless access link if the quantity of times is greater than or equal to the threshold, or control the wireless access device to continue moving in the second target direction if the quantity of times is less than the threshold.

In the foregoing embodiment, the first control module 1402 is further configured to control the wireless access device to sense, using a sensor, obstacle information in an environment in which the wireless access device and the mobile terminal are located and to construct, according to the obstacle information sensed by the sensor, the environment in which the wireless access device and the mobile terminal are located, and control the wireless access device to adjust the first target direction according to the environment in which the wireless access device and the mobile terminal are located.

In the foregoing embodiment, the second control module 1404 is further configured to control the wireless access device to sense, using a sensor, obstacle information in an environment in which the wireless access device and the mobile terminal are located and to construct, according to the obstacle information sensed by the sensor, the environment in which the wireless access device and the mobile terminal are located, and control the wireless access device to adjust the second target direction according to the environment in which the wireless access device and the mobile terminal are located.

The apparatus in this embodiment can correspondingly implement the technical solution in the method embodiment shown in FIG. 3, and implementation principles and technical effects thereof are similar and are not described herein again.

Figure 15:
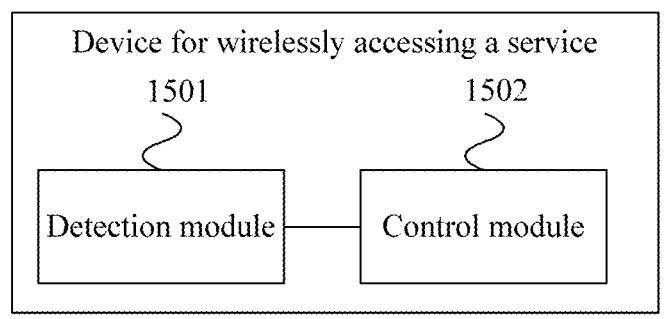
FIG. 15 is a schematic structural diagram of Embodiment 4 of a device for wirelessly accessing a service according to the present disclosure.

FIG. 15 is a schematic structural diagram of Embodiment 4 of a device for wirelessly accessing a service according to the present disclosure. The device for wirelessly accessing a service is a wireless access device, and the wireless access device includes a detection module 1501 and a control module 1502. The detection module 1501 is configured to detect whether quality of a first group of wireless access links satisfies a communication quality requirement of a mobile terminal set, where the first group of wireless access links includes R first wireless access links, the first wireless access link is a wireless access link between the wireless access device at a current location and any mobile terminal of R mobile terminals, and the R mobile terminals are R mobile terminals of M mobile terminals that access the wireless access device, where M≥1, and 1≤R≤M. The control module 1502 is configured to trigger the wireless access device to move from the current location to a target location when the detection module 1501 determines that the quality of the first group of wireless access links does not satisfy the communication quality requirement of the mobile terminal set, where quality of a second group of wireless access links satisfies the communication quality requirement of the mobile terminal set when the wireless access device moves to the target location, where the second group of wireless access links includes R second wireless access links, and the second wireless access link is a wireless access link between the wireless access device at the target location and any mobile terminal of the R mobile terminals.

In the foregoing embodiment, the device further includes a path planning module (not shown) configured to determine the target location according to parameters of the R first wireless access links before the control module triggers the wireless access device to move from the current location to the target location.

In the foregoing embodiment, the path planning module is further configured to acquire, according to the parameters of the R first wireless access links, location information of each of the R mobile terminals relative to the wireless access device, and determine the target location according to the location information of the R mobile terminals relative to the wireless access device.

In the foregoing embodiment, the path planning module is further configured to determine, according to a direction of an antenna beam used by each of the R mobile terminals for accessing the wireless access device, a direction of each of the R mobile terminals relative to the wireless access device, determine, according to a TOA, a distance of each of the R mobile terminals relative to the wireless access device, and determine, according to the direction and the distance, the location information of each of the R mobile terminals relative to the wireless access device.

In the foregoing embodiment, the path planning module is further configured to determine, according to angles of arrival of each of the R mobile terminals at two antennas in an antenna array, a direction and a distance of each of the R mobile terminals relative to the wireless access device.

In the foregoing embodiment, the control module 1502 is further configured to determine whether the quality of the first group of wireless access links satisfies the communication quality requirement of the mobile terminal set in recent previous N detections, where N is an integer greater than or equal to 1, and control the wireless access device to move from the current location to the target location when the quality of the first group of wireless access links does not satisfy the communication quality requirement of the mobile terminal set in the recent previous N detections.

In the foregoing embodiment, the path planning module is further configured to obtain an adjusted target location after determining the target location according to the parameters of the R first wireless access links, and adjust the target location according to an environment in which the wireless access device and the R mobile terminals are located, and the control module 1502 is further configured to trigger the wireless access device to move from the current location to the adjusted target location.

In the foregoing embodiment, before adjusting the target location according to the environment in which the wireless access device and the R mobile terminals are located, the path planning module is further configured to obtain the adjusted target location, sense, using a sensor, obstacle information in the environment in which the wireless access device and the R mobile terminals are located, and construct, according to the obstacle information sensed by the sensor, the environment in which the wireless access device and the R mobile terminals are located.

In the foregoing embodiment, the path planning module is further configured to receive a result of comparing the quality of the second group of wireless access links with the quality of the first group of wireless access links after the wireless access device is triggered to move from the current location to the target location, where the result is fed back by the wireless access device, and determine a target location of a next movement according to the result of comparing and parameters of the second wireless access links.

In the foregoing embodiment, after the path planning module determines the target location according to the parameters of the R first wireless access links, the control module 1502 is further configured to perform a local simulation to verify whether the second group of wireless access links satisfies the communication quality requirement of the mobile terminal set after the wireless access device moves to the target location, and the control module is further configured to trigger the wireless access device to move from the current location to the target location when a result of the local simulation is that the second group of wireless access links satisfies the communication quality requirement of the mobile terminal set.

The apparatus in this embodiment can correspondingly implement the technical solution in the method embodiment shown in FIG. 8, and implementation principles and technical effects thereof are similar and are not described herein again.

Figure 16:
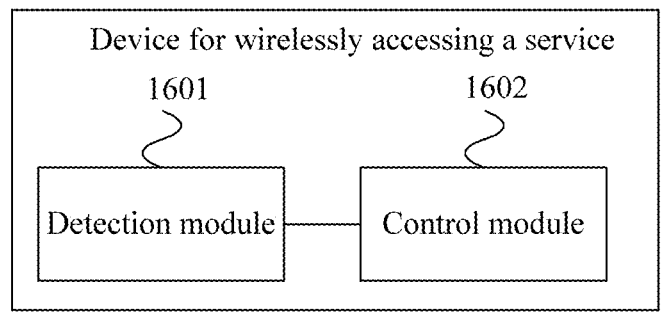
FIG. 16 is a schematic structural diagram of Embodiment 5 of a device for wirelessly accessing a service according to the present disclosure.

FIG. 16 is a schematic structural diagram of Embodiment 5 of a device for wirelessly accessing a service according to the present disclosure. The device for wirelessly accessing a service is a remote control center, and the remote control center in this embodiment includes a detection module 1601 and a control module 1602. The detection module 1601 is configured to detect whether quality of a first group of wireless access links satisfies a communication quality requirement of a mobile terminal set, where the first group of wireless access links includes R first wireless access links, the first wireless access link is a wireless access link between a wireless access device at a current location and any mobile terminal of R mobile terminals, and the R mobile terminals are R mobile terminals of M mobile terminals that access the wireless access device, where M≥1, and 1≤R≤M. The control module 1602 is configured to trigger, by the remote control center, the wireless access device to move from the current location to a target location when the quality of the first group of wireless access links does not satisfy the communication quality requirement of the mobile terminal set, where quality of a second group of wireless access links satisfies the communication quality requirement of the mobile terminal set when the wireless access device moves to the target location, where the second group of wireless access links includes R second wireless access links, and the second wireless access link is a wireless access link between the wireless access device at the target location and any mobile terminal of the R mobile terminals.

The apparatus in this embodiment can correspondingly implement the technical solution in the method embodiment shown in FIG. 9, and implementation principles and technical effects thereof are similar and are not described herein again.

Persons of ordinary skill in the art may understand that all or some of the steps of the method embodiments may be implemented by a program instructing relevant hardware. The program may be stored in a computer-readable storage medium. The steps of the method embodiments are performed when the program runs. The foregoing storage medium includes any medium that can store program code, such as a read-only memory (ROM), a random-access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for wirelessly accessing a service, comprising:
   detecting, by a wireless access device, whether a quality of a first wireless access link satisfies a communication quality requirement of a mobile terminal, the first wireless access link being a wireless access link between the wireless access device at a current location and the mobile terminal;
   starting, by the wireless access device, moving when the quality of the first wireless access link does not satisfy the communication quality requirement of the mobile terminal;
   detecting, by the wireless access device in a moving process of the wireless access device, whether a quality of a second wireless access link satisfies the communication quality requirement of the mobile terminal, the second wireless access link being another wireless access link between the wireless access device at a location after a movement and the mobile terminal;
   stopping, by the wireless access device, moving when the quality of the second wireless access link satisfies the communication quality requirement of the mobile terminal; and
   continuing, by the wireless access device, moving when the quality of the second wireless access link does not satisfy the communication quality requirement of the mobile terminal.

2. The method of claim 1, wherein the communication quality requirement of the mobile terminal is a received signal strength indicator (RSSI) of the mobile terminal that is not less than an RSSI threshold or an access rate of the mobile terminal that is not less than an access rate threshold or an access bandwidth of the mobile terminal that is not less than an access bandwidth threshold.

3. The method of claim 2, wherein the communication quality requirement of the mobile terminal is the RSSI of the mobile terminal that is not less than the RSSI threshold comprises an RSSI of the mobile terminal in a current service type that is not less than an RSSI threshold required by the current service type, the access rate of the mobile terminal that is not less than the access rate threshold comprises an access rate of the mobile terminal in the current service type that is not less than an access rate threshold required by the current service type, and the access bandwidth of the mobile terminal that is not less than the access bandwidth threshold comprises an access bandwidth of the mobile terminal in the current service type that is not less than an access bandwidth threshold required by the current service type.

4. The method of claim 1, wherein detecting, by the wireless access device in the moving process of the wireless access device, whether the quality of the second wireless access link satisfies the communication quality requirement of the mobile terminal comprises:
   setting, by the wireless access device, a periodical detection timer in the moving process of the wireless access device; and
   enabling a detection of whether the quality of the second wireless access link satisfies the communication quality requirement of the mobile terminal when the periodical detection tinier expires.

5. The method of claim 1, wherein starting, by the wireless access device, moving when the quality of the first wireless access link does not satisfy the communication quality requirement of the mobile terminal comprises:
   determining, by the wireless access device, a first target direction according to a parameter of the first wireless access link when the quality of the first wireless access link does not satisfy the communication quality requirement of the mobile terminal; and
   starting, by the wireless access device, moving in the first target direction when the quality of the first wireless access link does not satisfy the communication quality requirement of the mobile terminal.

6. The method of claim 5, wherein determining, by the wireless access device, the first target direction according to the parameter of the first wireless access link comprises:
 acquiring, by the wireless access device according to the parameter of the first wireless access link, a direction of the mobile terminal relative to the wireless access device; and
 determining, by the wireless access device, that the direction of the mobile terminal relative to the wireless access device is the first target direction.

7. The method of claim 5, wherein determining, by the wireless access device, the first target direction according to the parameter of the first wireless access link comprises determining, by the wireless access device, the first target direction according to a direction of an antenna beam used by the mobile terminal for accessing the wireless access device.

8. The method of claim 5, wherein determining, by the wireless access device, the first target direction according to the parameter of the first wireless access link comprises:
 determining, by the wireless access device according to angles of arrival of antenna beams transmitted from the mobile terminal to two antennas in an antenna array of the wireless access device, a direction of the mobile terminal relative to the wireless access device; and
 determining, by the wireless access device, that the direction of the mobile terminal. relative to the wireless access device is the first target direction.

9. The method of claim 1, wherein continuing, by the wireless access device, moving when the quality of the second wireless access link does not satisfy the communication quality requirement of the mobile terminal comprises:
 determining, by the wireless access device, a second target direction according to a parameter of the second wireless access link; and
 moving, by the wireless access device, in the second target direction.

10. The method of claim 9, wherein determining, by the wireless access device, the second target direction according to the parameter of the second wireless access link comprises:
 acquiring, by the wireless access device according to the parameter of the second wireless access link, a direction of the mobile terminal relative to the wireless access device; and
 determining, by the wireless access device, that the direction of the mobile terminal relative to the wireless access device is the second target direction.

11. The method of claim 9, wherein determining, by the wireless access device, the second target direction according to the parameter of the second wireless access link comprises determining, by the wireless access device, the second target direction according to a direction of an antenna beam used by the mobile terminal for accessing the wireless access device.

12. The method of claim 9, wherein determining, by the wireless access device, the second target direction according to the parameter of the second wireless access link comprises:
 determining, by the wireless access device according to angles of arrival of antenna beams transmitted from the mobile terminal to two antennas in an antenna array of the wireless access device, a direction of the mobile terminal relative to the wireless access device; and
 determining, by the wireless access device, that the direction of the mobile terminal relative to the wireless access device is the second target direction.

13. The method of claim 9, wherein before determining, by the wireless access device, the second target direction according to the parameter of the second wireless access link, the method further comprises:
 determining, by the wireless access device, whether a quantity of times a result of a detection is inferior to a result of a previous detection among results of recent N detections of the quality of the second wireless access link is greater than or equal to a threshold;
 determining, by the wireless access device, the second target direction according to the parameter of the second wireless access link when the quantity of times is greater than or equal to the threshold; and
 continuing, by the wireless access device, moving in a first target direction when the quantity of times is less than the threshold.

14. The method of claim 5, wherein after determining, by the wireless access device, the first target direction according to the parameter of the first wireless access link and before starting, by the wireless access device, moving in the first target direction, the method further comprises:
 sensing, by the wireless access device using a sensor, obstacle information in an environment in which the wireless access device and the mobile terminal are located;
 constructing, according to the obstacle information sensed by the sensor, the environment in which the wireless access device and the mobile terminal are located; and
 adjusting, by the wireless access device, the first target direction according to the environment in which the wireless access device and the mobile terminal are located.

15. The method of claim 9, wherein after determining, by the wireless access device, the second target direction according to the parameter of the second wireless access link and before moving, by the wireless access device, in the second target direction, the method further comprises:
 sensing, by the wireless access device using a sensor, obstacle information in an environment in which the wireless access device and the mobile terminal are located;
 constructing, according to the obstacle information sensed by the sensor, the environment in which the wireless access device and the mobile terminal are located; and
 adjusting, by the wireless access device, the second target direction according to the environment in which the wireless access device and the mobile terminal are located.

16. A method for wirelessly accessing a service, comprising:
 detecting, by a wireless access device, whether a quality of a first group of wireless access links satisfies a communication quality requirement of a mobile terminal set, the first group of wireless access links comprising R first wireless access links, each of the first wireless access links being a wireless access link between the wireless access device at a current location and one of R mobile terminals, the R mobile terminals being part of M mobile terminals that access the wireless access device, $M \geq 1$, and $1 \leq R \leq M$; and
 moving, by the wireless access device, from the current location to a target location when the quality of the first group of wireless access links does not satisfy the communication quality requirement of the mobile terminal set, a quality of a second group of wireless access links satisfying the communication quality requirement of the mobile terminal set when the wireless access device moves to the target location, the second group of wireless access links comprising R second wireless access links, and each of the second wireless access links being another wireless access link between the wireless access device at the target location and one of the R mobile terminals.

17. The method of claim 16, wherein the communication quality requirement of the mobile terminal set requires that each terminal of terminals of a preset quantity in the R mobile terminals or all terminals in the R mobile terminals satisfies a communication quality requirement of a mobile terminal, the communication quality requirement of the mobile terminal being a received signal strength indicator (RSSI) of the mobile terminal that is not less than an RSSI threshold or an access rate of the mobile terminal that is not less than an access rate threshold or an access bandwidth of the mobile terminal that is not less than an access bandwidth threshold.

18. The method of claim 16, wherein before moving, by the wireless access device, from the current location to the target location, the method further comprises determining, by the wireless access device, the target location according to parameters of the R first wireless access links.

19. The method of claim 18, wherein determining, by the wireless access device, the target location according to the parameters of the R first wireless access links comprises:
acquiring, by the wireless access device according to the parameters of the R first wireless access links, location information of each of the R mobile terminals relative to the wireless access device; and
determining, by the wireless access device, the target location according to the location information of the R mobile terminals relative to the wireless access device.

20. The method of claim 19, wherein acquiring, by the wireless access device according to the parameters of the R first wireless access links, the location information of each of the R mobile terminals relative to the wireless access device comprises:
determining, by the wireless access device according to a direction of an antenna beam used by each of the R mobile terminals for accessing the wireless access device, a direction of each of the R mobile terminals relative to the wireless access device;
determining, by the wireless access device according to a time of arrival (TOA), a distance of each of the R mobile terminals relative to the wireless access device; and
determining, by the wireless access device according to the direction and the distance, the location information of each of the R mobile terminals relative to the wireless access device.

21. The method of claim 19, wherein acquiring, by the wireless access device according to the parameters of the R first wireless access links, the location information of each of the R mobile terminals relative to the wireless access device comprises determining, by the wireless access device according to angles of arrival of each of the R mobile terminals at two antennas in an antenna array, a direction and a distance of each of the R mobile terminals relative to the wireless access device.

22. The method of claim 16, wherein moving, by the wireless access device, from the current location to the target location when the quality of the first group of wireless access links does not satisfy the communication quality requirement of the mobile terminal set comprises:
determining, by the wireless access device, whether the quality of the first group of wireless access links satisfies the communication quality requirement of the mobile terminal set in recent previous N detections, N is an integer greater than or equal to 1; and
triggering, by the wireless access device, the wireless access device to move from the current location to the target location when the quality of the first group of wireless access links does not satisfy the communication quality requirement of the mobile terminal set in the recent previous N detections.

23. The method of claim 18, wherein after determining, by the wireless access device, the target location according to the parameters of the R first wireless access links, the method further comprises adjusting, by the wireless access device, the target location according to an environment in which the wireless access device and the R mobile terminals are located, to obtain an adjusted target location, and moving, by the wireless access device, from the current location to the target location comprises moving, by the wireless access device, from the current location to the adjusted target location.

24. The method of claim 23, wherein before adjusting, by the wireless access device, the target location according to the environment in which the wireless access device and the R mobile terminals are located, to obtain the adjusted target location, the method further comprises:
sensing, by the wireless access device using a sensor, obstacle information in the environment in which the wireless access device and the R mobile terminals are located; and
constructing, according to the obstacle information sensed by the sensor, the environment in which the wireless access device and the R mobile terminals are located.

25. The method of claim 16, wherein after moving, by the wireless access device, from the current location to the target location, the method further comprises:
receiving, by the wireless access device, a result of comparing the quality of the second group of wireless access links with the quality of the first group of wireless access links, the result is fed back by the wireless access device; and
determining, by the wireless access device, a target location of a next movement according to the result of comparing and parameters of the second wireless access links.

26. The method of claim 18, wherein after determining, by the wireless access device, the target location according to the parameters of the R first wireless access links, the method further comprises:
performing, by the wireless access device, a local simulation to verify whether the second group of wireless access links satisfies the communication quality requirement of the mobile terminal set after the wireless access device moves to the target location; and
moving, by the wireless access device, from the current location to the target location when the quality of the first group of wireless access links does not satisfy the communication quality requirement of the mobile terminal set comprises moving, by the wireless access device, from the current location to the target location when the wireless access device determines that a result of the local simulation is that the second group of wireless access links satisfies the communication quality requirement of the mobile terminal set.

27. A method for wirelessly accessing a service, comprising:
detecting, by a remote control center, whether a quality of a first group of wireless access links satisfies a communication quality requirement of a mobile terminal set, the first group of wireless access links comprising R first wireless access links, each of the first wireless access links being a wireless access link between a wireless access device at a current location and one of R mobile terminals, the R mobile terminals being part of M mobile terminals that access the wireless access device, M≥1, and 1≤R≤M; and triggering, by the remote control center, the wireless access device to move from the current location to a target location when the remote control center determines that the quality of the first group of wireless access links does not satisfy the communication quality requirement of the mobile terminal set, a quality of a second group of wireless access links satisfying the communication quality requirement of the mobile terminal set when the wireless access device moves to the target location, the second group of wireless access links comprising R second wireless access links, and each of the second wireless access links being another wireless access link between the wireless access device at the target location and one of the R mobile terminals.

28. A device for wirelessly accessing a service, the device for wirelessly accessing the service being a wireless access device, and the wireless access device comprising:
a memory; and
a processor coupled to the memory and configured to:
detect whether a quality of a first wireless access link satisfies a communication quality requirement of a mobile terminal, the first wireless access link being a wireless access link between the wireless access device at a current location and the mobile terminal;
control the wireless access device to start moving when the quality of the first wireless access link does not satisfy the communication quality requirement of the mobile terminal;
detect, in a moving process of the wireless access device, whether a quality of a second wireless access link satisfies the communication quality requirement of the mobile terminal, the second wireless access link being another wireless access link between the wireless access device at a location after a movement and the mobile terminal;
control the wireless access device to stop moving when the quality of the second wireless access link satisfies the communication quality requirement of the mobile terminal; and
control the wireless access device to continue moving when the quality of the second wireless access link does not satisfy the communication quality requirement of the mobile terminal.

29. The device of claim 28, wherein the processor is further configured to:
set a periodical detection timer in the moving process of the wireless access device; and
enable a detection of whether the quality of the second wireless access link satisfies the communication quality requirement of the mobile terminal when the periodical detection timer expires.

30. The device of claim 28, wherein the processor is further configured to:
control the wireless access device to determine a first target direction according to a parameter of the first wireless access link when the quality of the first wireless access link does not satisfy the communication quality requirement of the mobile terminal; and
control the wireless access device to start moving in the first target direction.

31. The device of claim 30, wherein the processor is further configured to:
control the wireless access device to acquire, according to the parameter of the first wireless access link, a direction of the mobile terminal relative to the wireless access device; and
control the wireless access device to determine that the direction of the mobile terminal relative to the wireless access device is the first target direction.

32. The device of claim 30, wherein the processor is further configured to control the wireless access device to determine the first target direction according to a direction of an antenna beam used by the mobile terminal for accessing the wireless access device.

33. The device of claim 30, wherein the processor is further configured to:
control the wireless access device to determine, according to angles of arrival of antenna beams transmitted from the mobile terminal to two antennas in an antenna array of the wireless access device, a direction of the mobile terminal relative to the wireless access device; and
control the wireless access device to determine that the direction of the mobile terminal relative to the wireless access device is the first target direction.

34. The device of claim 28, wherein the processor is further configured to:
control the wireless access device to determine a second target direction according to a parameter of the second wireless access link; and
control the wireless access device to move in the second target direction.

35. The device of claim 34, wherein the processor is further configured to:
control the wireless access device to acquire, according to the parameter of the second wireless access link, a direction of the mobile terminal relative to the wireless access device; and
control the wireless access device to determine that the direction of the mobile terminal relative to the wireless access device is the second target direction.

36. The device of claim 34, wherein the processor is further configured to control the wireless access device to determine the second target direction according to a direction of an antenna beam used by the mobile terminal for accessing the wireless access device.

37. The device of claim 34, wherein the processor is further configured to:
control the wireless access device to determine, according to angles of arrival of antenna beams transmitted from the mobile terminal to two antennas in an antenna array of the wireless access device, a direction of the mobile terminal relative to the wireless access device; and
control the wireless access device to determine that the direction of the mobile terminal relative to the wireless access device is the second target direction.

38. The device of claim 34, wherein the processor is further configured to:
determine whether a quantity of times a result of a detection is inferior to a result of a previous detection among results of recent N detections of the quality of the second wireless access link is greater than or equal to a threshold;
control the wireless access device to determine the second target direction according to the parameter of the second wireless access link when the quantity of times is greater than or equal to the threshold; and
control the wireless access device to continue moving in the second target direction when the quantity of times is less than the threshold.

39. The device of claim 30, wherein the processor is further configured to:
control the wireless access device to sense, using a sensor, obstacle information in an environment in which the wireless access device and the mobile terminal are located;
construct, according to the obstacle information sensed by the sensor, the environment in which the wireless access device and the mobile terminal are located; and control the wireless access device to adjust the first target direction according to the environment in which the wireless access device and the mobile terminal are located.

40. The device of claim 34, wherein the processor is further configured to:
control the wireless access device to sense, using a sensor, obstacle information in an environment in which the wireless access device and the mobile terminal are located;
construct, according to the obstacle information sensed by the sensor, the environment in which the wireless access device and the mobile terminal are located; and
control the wireless access device to adjust the second target direction according to the environment in which the wireless access device and the mobile terminal are located.

41. A wireless access device for wirelessly accessing a service, comprising:
a memory; and
a processor coupled to the memory and configured to:
detect whether a quality of a first group of wireless access links satisfies a communication quality requirement of a mobile terminal set, the first group of wireless access links comprising R first wireless access links, each of the first wireless access links being a wireless access link between the wireless access device at a current location and one of R mobile terminals, the R mobile terminals being part of M mobile terminals that access the wireless access device, M≥1, and 1≤R≤M ; and
trigger the wireless access device to move from the current location to a target location when the quality of the first group of wireless access links does not satisfy the communication quality requirement of the mobile terminal set, a quality of a second group of wireless access links satisfying the communication quality requirement of the mobile terminal set when the wireless access device moves to the target location, the second group of wireless access links comprising R second wireless access links, and each of the second wireless access links being another wireless access link between the wireless access device at the target location and one of the R mobile terminals.

42. The wireless access device of claim 41, wherein the processor is further configured to determine the target location according to parameters of the R first wireless access links before triggering the wireless access device to move from the current location to the target location.

43. The wireless access device of claim 42, wherein the processor is further configured to:
acquire, according to the parameters of the R first wireless access links, location information of each of the R mobile terminals relative to the wireless access device; and
determine the target location according to the location information of the R mobile terminals relative to the wireless access device.

44. The wireless access device of claim 43, wherein the processor is further configured to:
determine, according to a direction of an antenna beam used by each of the R mobile terminals for accessing the wireless access device, a direction of each of the R mobile terminals relative to the wireless access device;
determine, according to a time of arrival (TOA), a distance of each of the R mobile terminals relative to the wireless access device; and
determine, according to the direction and the distance, the location information of each of the R mobile terminals relative to the wireless access device.

45. The wireless access device of claim 43, wherein the processor is further configured to determine, according to angles of arrival of each of the R mobile terminals at two antennas in an antenna array, a direction and a distance of each of the R mobile terminals relative to the wireless access device.

46. The wireless access device of claim 41, wherein the processor is further configured to:
determine whether the quality of the first group of wireless access links satisfies the communication quality requirement of the mobile terminal set in recent previous N detections, N being an integer greater than or equal to 1; and
control the wireless access device to move from the current location to the target location when the quality of the first group of wireless access links does not satisfy the communication quality requirement of the mobile terminal set in the recent previous N detections.

47. The wireless access device of claim 42, wherein the processor is further configured to:
adjust the target location according to an environment in which the wireless access device and the R mobile terminals are located, to obtain an adjusted target location after determining the target location according to the parameters of the R first wireless access links; and
trigger the wireless access device to move from the current location to the adjusted target location.

48. The wireless access device of claim 47, wherein before adjusting the target location according to the environment in which the wireless access device and the R mobile terminals are located, to obtain the adjusted target :location, the processor is further configured to:
sense, using a sensor, obstacle information in the environment in which the wireless access device and the R mobile terminals are located; and
construct, according to the obstacle information sensed by the sensor, the environment in which the wireless access device and the R mobile terminals are located.

49. The wireless access device of claim 41, wherein after the wireless access device is triggered to move from the current location to the target location, the processor is further configured to:
receive a result of comparing the quality of the second group of wireless access links with the quality of the first group of wireless access links, the result is fed back by the wireless access device; and
determine a target location of a next movement according to the result of comparing and parameters of the second wireless access links.

50. The wireless access device of claim 42, wherein. after determining the target location according to the parameters of the R first wireless access links, the processor is further configured to:
perform a local simulation to verify whether the second group of wireless access links satisfies the communication quality requirement of the mobile terminal set after the wireless access device moves to the target location; and
trigger the wireless access device to move from the current location to the target location when a result of the local simulation is that the second group of wireless access links satisfies the communication quality requirement of the mobile terminal set.

51. A remote control center for wirelessly accessing a service, comprising:
a memory; and
a processor coupled to the memory and configured to:
detect Whether a quality of a first group of wireless access links satisfies a communication quality requirement of a mobile terminal set, the first group of wireless access links comprising R first wireless access links, each of the first wireless access links being a wireless access link between a wireless access device at a current location and one of R mobile terminals, the R mobile terminals being part of M mobile terminals that access the wireless access device, $M \geq 1$, and $1 \leq R \leq M$; and trigger, the wireless access device to move from the current location to a target location when the quality of the first group of wireless access links does not satisfy the communication quality requirement of the mobile terminal set, a quality of a second group of wireless access links satisfying the communication quality requirement of the mobile terminal set when the wireless access device moves to the target location, the second group of wireless access links comprising R second wireless access links, and each of the second wireless access links being another wireless access link between the wireless access device at the target location and one of the R mobile terminals.

* * * * *

UNITED STATES PATENT AND TRADEMARK OFFICE
CERTIFICATE OF CORRECTION

PATENT NO. : 10,123,220 B2
APPLICATION NO. : 15/241865
DATED : November 6, 2018
INVENTOR(S) : Yingtao Li et al.

Page 1 of 1

It is certified that error appears in the above-identified patent and that said Letters Patent is hereby corrected as shown below:

On the Title Page

Item (30), "Foreign Application Priority Data" section should read:
Feb. 19, 2014   (CN) ........................................ 201410056660.1

In the Claims

Column 38, Claim 4, Line 55 should read:
enabling a detection of whether the quality of the second wireless access link satisfies the communication quality requirement of the mobile terminal when the periodical detection timer expires.

Signed and Sealed this
Twenty-fifth Day of December, 2018

Andrei Iancu
*Director of the United States Patent and Trademark Office*